United States Patent
Sun et al.

(10) Patent No.: US 12,462,726 B2
(45) Date of Patent: Nov. 4, 2025

(54) DISPLAY METHOD FOR CONTROLLING DISPLAY BRIGHTNESS DURING FINGERPRINT RECOGNITION, AND ELECTRONIC DEVICE THEREFOR

(71) Applicant: Huawei Technologies Co., Ltd., Shenzhen (CN)

(72) Inventors: Jialiang Sun, Shenzhen (CN); Kai Xu, Shenzhen (CN); Ruizhe Li, Shanghai (CN); Menghu Shen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/575,646

(22) PCT Filed: Jun. 10, 2022

(86) PCT No.: PCT/CN2022/098236
§ 371 (c)(1),
(2) Date: Dec. 29, 2023

(87) PCT Pub. No.: WO2023/273844
PCT Pub. Date: Jan. 5, 2023

(65) Prior Publication Data
US 2024/0339068 A1   Oct. 10, 2024

(30) Foreign Application Priority Data
Jun. 30, 2021   (CN) .......................... 202110745146.9

(51) Int. Cl.
*G09G 3/20* (2006.01)
*G06V 40/13* (2022.01)
*G06V 40/60* (2022.01)

(52) U.S. Cl.
CPC ....... *G09G 3/2092* (2013.01); *G06V 40/1318* (2022.01); *G06V 40/67* (2022.01);
(Continued)

(58) Field of Classification Search
CPC .............. G09G 3/2092; G09G 3/2007; G09G 2320/0247; G09G 2320/0686; G09G 2354/00; G06V 40/1318; G06V 40/67
See application file for complete search history.

(56) References Cited

U.S. PATENT DOCUMENTS

| | | | |
|---|---|---|---|
| 2019/0087620 A1* | 3/2019 | Kim | .................... G06V 40/1318 |
| 2019/0228203 A1* | 7/2019 | Kim | .................... G06V 40/1329 |

(Continued)

FOREIGN PATENT DOCUMENTS

| | | |
|---|---|---|
| CN | 107798303 A | 3/2018 |
| CN | 108520241 A | 9/2018 |

(Continued)

*Primary Examiner* — David D Davis
(74) *Attorney, Agent, or Firm* — Slater Matsil, LLP

(57) ABSTRACT

Embodiments of this application provide a display method and an electronic device. The electronic device includes an application processor, a display driver chip, and a display panel. The display panel is configured to display a first image. The application processor is configured to send first indication information and a first parameter to the display driver chip. The display driver chip is configured to: control, based on the received first indication information, brightness of a fingerprint recognition area in the first image to be first brightness, and control brightness of a mask area in the first image to be second brightness. The brightness of the mask area is controlled based on the first parameter, and the mask area is an area in the first image except the fingerprint recognition area. The display panel is configured to display an updated first image.

20 Claims, 17 Drawing Sheets

(52) U.S. Cl.
CPC ... *G09G 3/2007* (2013.01); *G09G 2320/0247* (2013.01); *G09G 2320/0686* (2013.01); *G09G 2354/00* (2013.01)

(56) References Cited

U.S. PATENT DOCUMENTS

| | | |
|---|---|---|
| 2020/0286431 A1 | 9/2020 | Sugiyama et al. |
| 2021/0012717 A1 | 1/2021 | Park et al. |
| 2021/0327329 A1* | 10/2021 | Chen ........................ G09G 3/20 |

FOREIGN PATENT DOCUMENTS

| | | | | |
|---|---|---|---|---|
| CN | 109753336 A | | 5/2019 | |
| CN | 110276326 A | * | 9/2019 | ........... G06K 9/0004 |
| CN | 110310597 A | | 10/2019 | |
| CN | 109801605 B | | 1/2021 | |
| CN | 113297880 A | | 8/2021 | |

* cited by examiner

DISPLAY METHOD FOR CONTROLLING DISPLAY BRIGHTNESS DURING FINGERPRINT RECOGNITION, AND ELECTRONIC DEVICE THEREFOR

CROSS-REFERENCE TO RELATED APPLICATIONS

This application is a National Stage of International Application No. PCT/CN2022/098236, filed on Jun. 10, 2022, which claims priority to Chinese Patent Application No. 202110745146.9, filed on Jun. 30, 2021. Both of the aforementioned applications are hereby incorporated by reference in their entireties.

TECHNICAL FIELD

This application relates to the field of computer technologies, and in particular, to a display method and an electronic device.

BACKGROUND

A fingerprint recognition technology is widely applied to electronic devices, for example, an optical fingerprint recognition technology. The electronic device may display, in a fingerprint recognition area in a display screen, a light spot with a specific shape and specific brightness (such as an elliptic highlighted light spot or a circular highlighted light spot). When a finger of a user acts on the light spot, the electronic device may collect optical fingerprint information of the user, to implement functions such as fingerprint unlocking, fingerprint payment, and fingerprint photographing.

The electronic device may include an application processor (application processor, AP). A user interface for optical fingerprint recognition is usually drawn by the AP, and is then sent to the display screen for display. However, such display effect is unsatisfactory. For example, when a mode such as an eye protection mode or a bright mode is enabled on the electronic device, an image drawn by the AP needs to be processed by a color module corresponding to the foregoing mode. Consequently, a serious color cast and serious grayscale transition occur in an actually displayed image. If the mode such as the eye protection mode or the bright mode is disabled during optical fingerprint recognition, and is enabled again after the optical fingerprint recognition is completed, the screen may flicker, a hue may abruptly change, or the like. Consequently, a public opinion from the user is caused.

SUMMARY

Embodiments of this application provide a display method and an electronic device, so that display effect generated during optical fingerprint recognition can be improved, and user experience can be improved.

According to a first aspect, an embodiment of this application provides an electronic device. The electronic device includes an application processor and a display screen. The display screen includes a display driver chip and a display panel. The display panel is configured to display a first image. The application processor is configured to send first indication information and a first parameter to the display driver chip. The display driver chip is configured to: control, based on the received first indication information, brightness of a fingerprint recognition area in the first image to be first brightness, and control brightness of a mask area in the first image to be second brightness. The brightness of the mask area is controlled based on the first parameter, and the mask area is an area in the first image except the fingerprint recognition area. The display panel is configured to display an updated first image. Brightness of the fingerprint recognition area in the updated first image is the first brightness, and brightness of the mask area is the second brightness.

In some embodiments, the first image is an image used before fingerprint recognition, and the updated first image is an image used during fingerprint recognition. Brightness of the first image is the second brightness. In some embodiments, the first brightness is greater than the second brightness, and is greater than or equal to a preset brightness value. In some embodiments, when the display panel displays the first image, the electronic device collects optical fingerprint information of a finger performing a touch operation on the fingerprint recognition area.

In this application, the display driver chip may both control the brightness of the fingerprint recognition area based on the first indication information sent by the application processor, and control the brightness of the mask area based on the first parameter sent by the application processor (which may be understood as updating the first image), to avoid screen flickering. In addition, the application processor does not need to draw the updated first image, thereby simplifying a processing procedure on an application processor side and increasing a recognition speed. The updated first image is not processed by a color module on the application processor side. In this case, it may be ensured that a display mode such as an eye protection mode or a bright mode is enabled when the updated first image is displayed, thereby avoiding a public opinion from a user, and also ensuring relatively good display effect of the mask area.

In a possible implementation, that the display driver chip controls brightness of a fingerprint recognition area in the first image to be first brightness includes: setting a grayscale of a pixel in the fingerprint recognition area to a first value, and setting a display brightness value to a second value, where a value of a grayscale of a pixel in the display panel is less than or equal to the first value, a display brightness value of a pixel in the display panel is less than or equal to the second value, a grayscale corresponding to the first brightness is the first value, and a corresponding display brightness value is the second value.

In some embodiments, a value range of the grayscale of the pixel in the display panel is 0 to 255, and the first value is 255. In some embodiments, a value range of the display brightness value of the pixel in the display panel is 0 to 4095, and the second value is 4095.

In a possible implementation, the application processor is further configured to send a brightness code of the fingerprint recognition area to the display driver chip, where the brightness code is used to indicate at least one of the following: brightness, a color, a shape, a size, and a location; and that the display driver chip controls brightness of a fingerprint recognition area in the first image to be first brightness includes: controlling display of the fingerprint recognition area in the first image based on the received brightness code.

In this application, a parameter used to control display of the fingerprint recognition area may be a parameter that is configured by the application processor in real time based on different scenarios. Therefore, adaptability is stronger, and an application scenario is more extensive.

In a possible implementation, the display driver chip controls brightness of a fingerprint recognition area in the first image to be first brightness includes: controlling display of the fingerprint recognition area in the first image based on a preconfigured brightness code.

In a possible implementation, the brightness of the fingerprint recognition area in the updated first image is greater than the brightness of the fingerprint recognition area in the first image; and the brightness and display content of the mask area in the updated first image are the same as the brightness and display content of the mask area in the first image.

In a possible implementation, when the display panel displays the updated first image, a light adjustment mode of the display screen is direct current adjustment, and the first parameter is an alpha value determined based on a grayscale of the mask area and the light adjustment mode that is of the display screen and that is used when the display panel displays the first image.

In a possible implementation, when the display panel displays the first image, if the light adjustment mode of the display screen is pulse-width modulation, the first parameter is less than 1; or when the display panel displays the first image, if the light adjustment mode of the display screen is a direct current, the first parameter is equal to 1.

In a possible implementation, when the display panel displays the first image, the light adjustment mode of the display screen is the pulse-width modulation, and the grayscale of the mask area is a first grayscale; the display driver chip is further configured to switch the light adjustment mode of the display screen to the direct current based on the received first indication information; that the display driver chip controls brightness of a mask area in the display panel includes: after the light adjustment mode of the display screen is switched to the direct current, multiplying the first parameter by a second grayscale corresponding to the mask area, where the second grayscale is greater than the first grayscale; and when the display panel displays the updated first image, the grayscale of the mask area is the first grayscale obtained by multiplying the second grayscale by the first parameter, and a grayscale corresponding to the second brightness is the first grayscale.

In some embodiments, the first parameter is equal to a ratio of the first grayscale to the second grayscale.

In a possible implementation, the fingerprint recognition area includes a first fingerprint recognition area and a second fingerprint recognition area, and the display driver chip includes a first display driver chip and a second display driver chip, where the first display driver chip is configured to control brightness of the first fingerprint recognition area in the first image based on the received first indication information; and the second display driver chip is configured to control brightness of the second fingerprint recognition area in the first image based on the received first indication information.

In this application, a manner of displaying the fingerprint recognition area such as a quantity or a location may be flexibly configured based on an actual requirement, and brightness of different fingerprint recognition areas may be separately controlled by using different display driver chips, to avoid excessive processing pressure caused by a single display driver chip controlling a plurality of fingerprint recognition areas.

In a possible implementation, the display screen is a foldable screen.

According to a second aspect, an embodiment of this application provides a communication apparatus, including a processor, a memory, and a communication interface. The processor is configured to determine first indication information and a first parameter. The communication interface is configured to send the first indication information and the first parameter to a display screen, where the first indication information is used to indicate to control brightness of a fingerprint recognition area and brightness of a mask area that are in a first image displayed by the display screen, the mask area is an area in the first image except the fingerprint recognition area, and the first parameter is used to control the brightness of the mask area.

In some embodiments, the communication apparatus is an application processor application processor.

In some embodiments, the first image is an image used before fingerprint recognition. An image displayed after the brightness of the fingerprint recognition area and the brightness of the mask area that are in the first image displayed by the display screen are controlled is the updated first image, that is, an image used during fingerprint recognition. Brightness of the first image is second brightness. In some embodiments, first brightness is greater than the second brightness, and is greater than or equal to a preset brightness value.

In this application, the display screen may both control the brightness of the fingerprint recognition area based on the first indication information sent by the application processor, and control the brightness of the mask area based on the first parameter sent by the application processor (which may be understood as updating the first image), to avoid screen flickering. In addition, the application processor does not need to draw the updated first image, thereby simplifying a processing procedure on an application processor side and increasing a recognition speed. The updated first image is not processed by a color module on the application processor side. In this case, it may be ensured that a display mode such as an eye protection mode or a bright mode is enabled when the updated first image is displayed, thereby avoiding a public opinion from a user, and also ensuring relatively good display effect of the mask area.

In a possible implementation, the processor is further configured to determine a brightness code of the fingerprint recognition area, where the brightness code is used to indicate at least one of the following: brightness, a color, a shape, a size, and a location; and the communication interface is further configured to send the brightness code to the display panel, where the brightness code is used to control display of the fingerprint recognition area in the first image.

In this application, a parameter used to control display of the fingerprint recognition area may be a parameter that is configured by the application processor in real time based on different scenarios. Therefore, adaptability is stronger, and an application scenario is more extensive.

According to a third aspect, an embodiment of this application provides another communication apparatus, including a processor, a memory, and a communication interface. The processor is configured to control a display panel of a display screen to display a first image. The communication interface is configured to: receive first indication information and a first parameter, and transmit the first indication information and the first parameter to the processor. The processor is configured to: control, based on the received first indication information, brightness of a fingerprint recognition area in the first image to be first brightness, and control brightness of a mask area in the first image to be second brightness. The brightness of the mask area is controlled based on the first parameter, and the mask area is an area in the first image except the fingerprint recognition area. The processor is configured to control the display panel to display an updated first image. Brightness of the fingerprint recognition area in the updated first image is the first brightness, and brightness of the mask area is the second brightness.

In some embodiments, the communication apparatus is a display driver chip display driver chip of the display screen. In some embodiments, the first indication information and the first parameter that are received by the communication interface are sent by an application processor.

In some embodiments, the first image is an image used before fingerprint recognition, and the updated first image is an image used during fingerprint recognition. Brightness of the first image is the second brightness. In some embodiments, the first brightness is greater than the second brightness, and is greater than or equal to a preset brightness value.

In this application, the display driver chip may both control the brightness of the fingerprint recognition area based on the received first indication information, and control the brightness of the mask area based on the received first parameter (which may be understood as updating the first image), to avoid screen flickering. In addition, the application processor does not need to draw the updated first image, thereby simplifying a processing procedure on an application processor side and increasing a recognition speed. The updated first image is not processed by a color module on the application processor side. In this case, it may be ensured that a display mode such as an eye protection mode or a bright mode is enabled when the updated first image is displayed, thereby avoiding a public opinion from a user, and also ensuring relatively good display effect of the mask area.

In a possible implementation, that the processor controls brightness of a fingerprint recognition area in the first image to be first brightness includes: setting a grayscale of a pixel in the fingerprint recognition area to a first value, and setting a display brightness value to a second value, where a value of a grayscale of a pixel in the display panel is less than or equal to the first value, a display brightness value of a pixel in the display panel is less than or equal to the second value, a grayscale corresponding to the first brightness is the first value, and a corresponding display brightness value is the second value.

In some embodiments, a value range of the grayscale of the pixel in the display panel is 0 to 255, and the first value is 255. In some embodiments, a value range of the display brightness value of the pixel in the display panel is 0 to 4095, and the second value is 4095.

In a possible implementation, the communication interface is further configured to: receive a brightness code of the fingerprint recognition area, and transmit the brightness code to the processor, where the brightness code is used to indicate at least one of the following: brightness, a color, a shape, a size, and a location; and that the processor controls brightness of a fingerprint recognition area in the first image to be first brightness includes: controlling display of the fingerprint recognition area in the first image based on the received brightness code.

In this application, a parameter used to control display of the fingerprint recognition area may be a parameter that is configured by the application processor in real time based on different scenarios. Therefore, adaptability is stronger, and an application scenario is more extensive.

In a possible implementation, the controlling brightness of a fingerprint recognition area in the first image to be first brightness includes: controlling display of the fingerprint recognition area in the first image based on a preconfigured brightness code.

In a possible implementation, the brightness of the fingerprint recognition area in the updated first image is greater than the brightness of the fingerprint recognition area in the first image; and the brightness and display content of the mask area in the updated first image are the same as the brightness and display content of the mask area in the first image.

In a possible implementation, when the processor controls the display panel to display the updated first image, a light adjustment mode of the display screen is direct current adjustment, and the first parameter is an alpha value determined based on a grayscale of the mask area and the light adjustment mode that is of the display screen and that is used when the processor controls the display panel of the display screen to display the first image.

In a possible implementation, when the processor controls the display panel of the display screen to display the first image, if the light adjustment mode of the display screen is pulse-width modulation, the first parameter is less than 1; or when the processor controls the display panel of the display screen to display the first image, if the light adjustment mode of the display screen is a direct current, the first parameter is equal to 1.

In a possible implementation, when the processor controls the display panel of the display screen to display the first image, the light adjustment mode of the display screen is the pulse-width modulation, and the grayscale of the mask area is a first grayscale; the processor is further configured to switch the light adjustment mode of the display screen to the direct current based on the received first indication information; that the processor controls brightness of a mask area in the first image to be second brightness includes: after the light adjustment mode of the display screen is switched to the direct current, multiplying the first parameter by a second grayscale corresponding to the mask area, where the second grayscale is greater than the first grayscale; and when the processor controls the display panel to display the updated first image, the grayscale of the mask area is the first grayscale obtained by multiplying the second grayscale by the first parameter, and a grayscale corresponding to the second brightness is the first grayscale.

In some embodiments, the first parameter is equal to a ratio of the first grayscale to the second grayscale.

In a possible implementation, the display screen is a foldable screen.

According to a fourth aspect, an embodiment of this application provides a display method, applied to an electronic device. The electronic device includes an application processor and a display screen. The display screen includes a display driver chip and a display panel. The method includes: displaying, by the display panel, a first image; sending, by the application processor, first indication information and a first parameter to the display driver chip; controlling, by the display driver chip based on the received first indication information, brightness of a fingerprint recognition area in the first image to be first brightness, and controlling brightness of a mask area in the first image to be second brightness, where the brightness of the mask area is controlled based on the first parameter, and the mask area is an area in the first image except the fingerprint recognition area; and displaying, by the display panel, an updated first image, where brightness of the fingerprint recognition area in the updated first image is the first brightness, and brightness of the mask area is the second brightness.

In some embodiments, the first image is an image used before fingerprint recognition, and the updated first image is an image used during fingerprint recognition. Brightness of the first image is the second brightness. In some embodiments, the first brightness is greater than the second brightness, and is greater than or equal to a preset brightness value. In some embodiments, when the display panel displays the first image, the electronic device collects optical fingerprint information of a finger performing a touch operation on the fingerprint recognition area.

In this application, the display driver chip may both control the brightness of the fingerprint recognition area based on the first indication information sent by the application processor, and control the brightness of the mask area based on the first parameter sent by the application processor (which may be understood as updating the first image), to avoid screen flickering. In addition, the application processor does not need to draw the updated first image, thereby simplifying a processing procedure on an application processor side and increasing a recognition speed. The updated first image is not processed by a color module on the application processor side. In this case, it may be ensured that a display mode such as an eye protection mode or a bright mode is enabled when the updated first image is displayed, thereby avoiding a public opinion from a user, and also ensuring relatively good display effect of the mask area.

In a possible implementation, the controlling brightness of a fingerprint recognition area in the first image to be first brightness includes: setting a grayscale of a pixel in the fingerprint recognition area to a first value, and setting a display brightness value to a second value, where a value of a grayscale of a pixel in the display panel is less than or equal to the first value, a display brightness value of a pixel in the display panel is less than or equal to the second value, a grayscale corresponding to the first brightness is the first value, and a corresponding display brightness value is the second value.

In some embodiments, a value range of the grayscale of the pixel in the display panel is 0 to 255, and the first value is 255. In some embodiments, a value range of the display brightness value of the pixel in the display panel is 0 to 4095, and the second value is 4095.

In a possible implementation, the method further includes: sending, by the application processor, a brightness code of the fingerprint recognition area to the display driver chip, where the brightness code is used to indicate at least one of the following: brightness, a color, a shape, a size, and a location; and the controlling brightness of a fingerprint recognition area in the first image to be first brightness includes: controlling display of the fingerprint recognition area in the first image based on the received brightness code.

In this application, a parameter used to control display of the fingerprint recognition area may be a parameter that is configured by the application processor in real time based on different scenarios. Therefore, adaptability is stronger, and an application scenario is more extensive.

In a possible implementation, the controlling brightness of a fingerprint recognition area in the first image to be first brightness includes: controlling display of the fingerprint recognition area in the first image based on a preconfigured brightness code.

In a possible implementation, the brightness of the fingerprint recognition area in the updated first image is greater than the brightness of the fingerprint recognition area in the first image; and the brightness and display content of the mask area in the updated first image are the same as the brightness and display content of the mask area in the first image.

In a possible implementation, when the display panel displays the updated first image, a light adjustment mode of the display screen is direct current adjustment, and the first parameter is an alpha value determined based on a grayscale of the mask area and the light adjustment mode that is of the display screen and that is used when the display panel displays the first image.

In a possible implementation, when the display panel displays the first image, if the light adjustment mode of the display screen is pulse-width modulation, the first parameter is less than 1; or when the display panel displays the first image, if the light adjustment mode of the display screen is a direct current, the first parameter is equal to 1.

In a possible implementation, when the display panel displays the first image, the light adjustment mode of the display screen is the pulse-width modulation, and the grayscale of the mask area is a first grayscale; and the method further includes: switching the light adjustment mode of the display screen to the direct current based on the received first indication information; and the controlling brightness of a mask area in the display panel includes: after the light adjustment mode of the display screen is switched to the direct current, multiplying the first parameter by a second grayscale corresponding to the mask area, where the second grayscale is greater than the first grayscale; and when the display panel displays the updated first image, the grayscale of the mask area is the first grayscale obtained by multiplying the second grayscale by the first parameter, and a grayscale corresponding to the second brightness is the first grayscale.

In some embodiments, the first parameter is equal to a ratio of the first grayscale to the second grayscale.

In a possible implementation, the fingerprint recognition area includes a first fingerprint recognition area and a second fingerprint recognition area, and the display driver chip includes a first display driver chip and a second display driver chip; and the controlling, by the display driver chip based on the received first indication information, brightness of a fingerprint recognition area in the first image to be first brightness includes: controlling, by the first display driver chip, brightness of the first fingerprint recognition area in the first image based on the received first indication information, and controlling, by the second display driver chip, brightness of the second fingerprint recognition area in the first image based on the received first indication information.

According to a fifth aspect, an embodiment of this application provides a computer storage medium, where the computer storage medium stores a computer program, and when the computer program is executed by a processor, the display method provided in any one of the fourth aspect of the embodiments of this application or the implementations of the fourth aspect is implemented.

According to a sixth aspect, an embodiment of this application provides a computer program product. When the computer program product runs on a communication apparatus, the communication apparatus is enabled to perform the display method provided in any one of the fourth aspect of the embodiments of this application or the implementations of the fourth aspect.

According to a seventh aspect, an embodiment of this application provides an electronic device. The electronic device includes the method or apparatus for performing any embodiment of this application. The electronic device is, for example, a chip.

It should be understood that, descriptions of technical features, technical solutions, beneficial effects, or similar words in this application do not imply that all features and advantages can be implemented in any individual embodiment. In contrast, it may be understood that, the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be a same embodiment. Further, the technical features, the technical solutions, and the beneficial effects described in the embodiments may be combined in any proper manner. A person skilled in the art understands that an embodiment may be implemented without one or more specific technical features or technical solutions, or beneficial effects in a specific embodiment. In other embodiments, additional technical features and beneficial effects may be identified in a specific embodiment that does not reflect all embodiments.

DETAILED DESCRIPTION OF ILLUSTRATIVE EMBODIMENTS

Terms used in the descriptions of the present invention in this specification are merely for the purpose of describing specific embodiments, and are not intended to limit the present invention. Terms "one", "a", "the", "the said" and "this" in a singular form used in this specification and the appended claims of the present invention are also intended to include plural forms, unless otherwise specified in the context clearly. It should be further understood that, the term "and/or" used in this specification indicates and includes any or all possible combinations of one or more associated listed items.

An electronic device used in embodiments of this application may be a mobile terminal such as a mobile phone, a tablet computer, a handheld computer, or a personal digital assistant (Personal Digital Assistant, PDA), a smart home device such as a smart television or a smart camera, a wearable device such as a smart band, a smartwatch, or smart glasses, or another device such as a desktop computer, a laptop computer, a notebook computer, an ultra-mobile personal computer (Ultra-mobile Personal Computer, UMPC), a netbook, or a smart screen.

The following describes an example of an electronic device 100 in an embodiment of this application.

Figure 1:
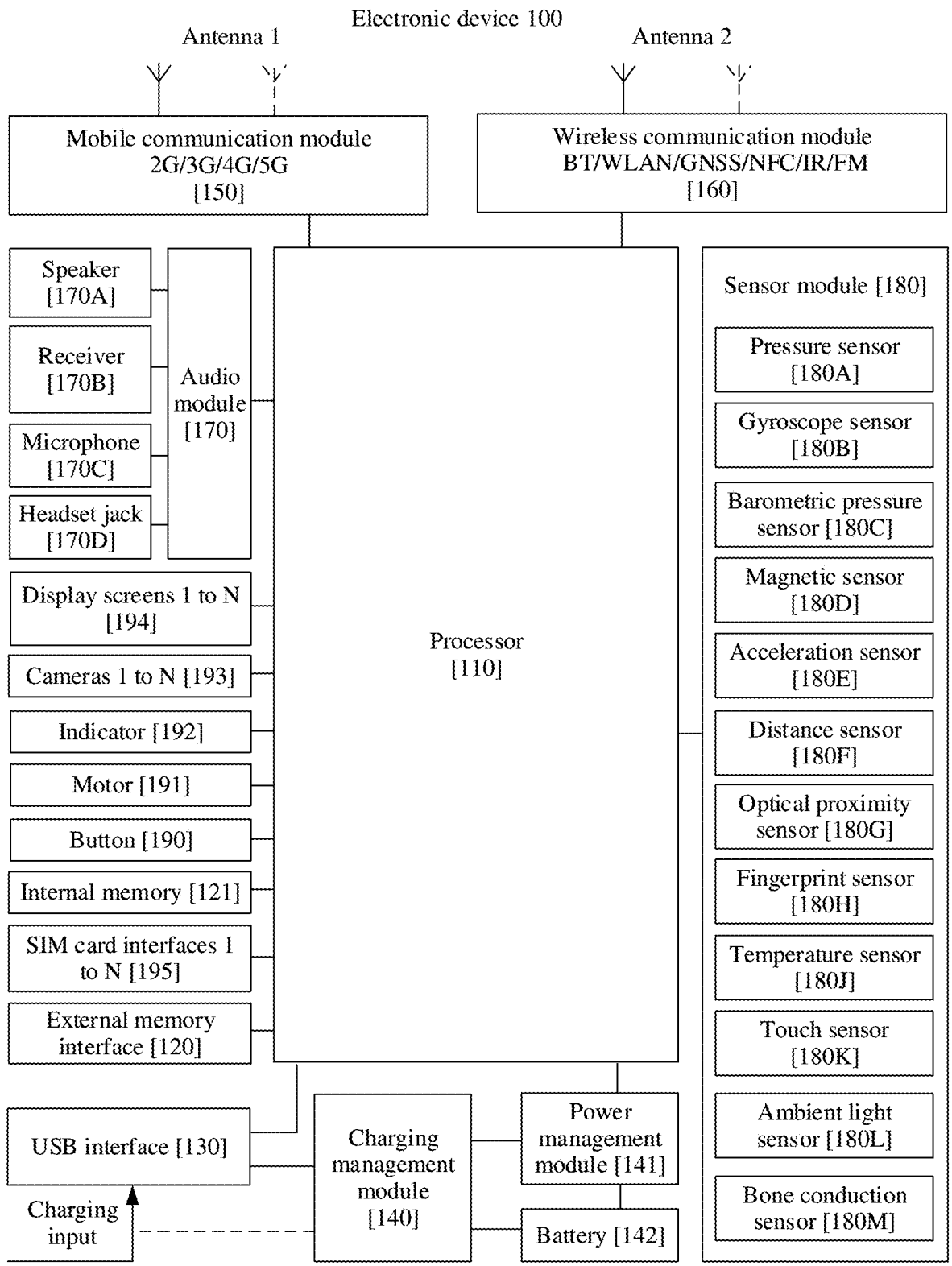
FIG. 1 to FIG. 4 are schematic diagrams of structures of some electronic devices according to embodiments of this application.

FIG. 1 is an example of a schematic diagram of a hardware structure of an electronic device 100.

As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component layouts. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors. For example, the plurality of processing units shown above are all integrated into one system-on-a-chip (system on chip, SoC). Alternatively, the AP is an independent semiconductor chip, and other processing units are integrated into one SoC. This is not limited in this application.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may save instructions or data that has just been used or cyclically used by the processor 110. If the processor 110 needs to use the instructions or the data again, the processor may directly invoke the instructions or the data from the memory. This avoids repeated access, and reduces a waiting time of the processor 110, thereby increasing system efficiency.

In some embodiments, the processor 110 may include one or more communication interfaces (interfaces for short). The interface may include, for example, but is not limited to, an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, an MIPI, a general-purpose input/output (general-purpose input/output, GPIO) interface, a subscriber identity module (subscriber identity module, SIM) interface, a universal serial bus (universal serial bus, USB) interface, and/or the like.

The MIPI interface may be configured to connect the processor 110 to a peripheral device such as the camera 193 or the display screen 194. In some embodiments, the MIPI interface may include a display serial interface (display serial interface, DSI), a camera serial interface (camera serial interface, CSI), and the like. Optionally, the processor 110 communicates with the camera 193 through the CSI interface, to implement a photographing function of the electronic device 100. Optionally, the processor 110 communicates with the display screen 194 through the DSI interface, to implement a display function of the electronic device 100.

It may be understood that an interface connection relationship that is between the modules and that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or an input from the charging management module 140, and supplies power to the processor 110, the internal memory 121, the display screen 194, the camera 193, the wireless communication module 160, and the like. The power management module 141 may be further configured to monitor a parameter such as a battery capacity, a quantity of battery cycles, or a state of health of the battery (electric leakage or impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to: transmit and receive an electromagnetic wave signal. Each antenna in the electronic device 100 may be configured to cover one or more communication frequency bands. Different antennas may be reused to increase antenna utilization. For example, the antenna 1 may be reused as a diversity antenna in a wireless local area network. In some other embodiments, the antennas may be used in combination with a tuning switch.

The mobile communication module 150 may provide wireless communication solutions that include 2G, 3G, 4G, 5G, or the like and that are applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert, by using the antenna 1, the signal into an electromagnetic wave for radiation. In some embodiments, at least some function modules of the mobile communication module 150 may be disposed in the processor 110. In some embodiments, the at least some function modules of the mobile communication module 150 may be disposed in a same device as at least some modules of the processor 110.

The modem processor may include a modulator and a demodulator. The modulator is configured to modulate a to-be-sent low-frequency baseband signal into an intermediate-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the receiver 170B, or the like), or displays an image or a video by using the display screen 194. In some embodiments, the modem processor may be an independent device. In some other embodiments, the modem processor may be independent of the processor 110, and is disposed in a same device as the mobile communication module 150 or another function module.

The wireless communication module 160 may provide wireless communication solutions applied to the electronic device 100, including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert, by using the antenna 2, the to-be-sent signal into an electromagnetic wave for radiation.

In some embodiments, the antenna 1 of the electronic device 100 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display screen 194, the application processor, and the like. In some embodiments, the GPU is a microprocessor for image processing, and is connected to the display screen 194 and the application processor. The GPU is configured to: perform mathematical and geometric calculation, and render graphics. The processor 110 may include one or more GPUs, and the GPUs execute a program instruction to generate or change display information.

The display screen 194 is configured to display an image, a video, or the like. The display screen 194 may include a display driver integrated circuit (display driver integrated circuit, DDIC) and a display panel. The DDIC is an apparatus (for example, a chip) that is inside the display screen 194 and that is configured to control the display screen 194 to work. For example, the DDIC may generate a specific electrical signal to control the display panel to display an image. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N display screens 194, where N is a positive integer greater than 1. In some embodiments, one display screen 194 may include one or N DDICs.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is pressed, light is transferred to a photosensitive element of the camera through a lens, an optical signal is converted into an electrical signal, and the photosensitive element of the camera transfers the electrical signal to the ISP for processing, to convert the electrical signal into a visible image. The ISP may further perform algorithm optimization on noise, brightness, and a complexion of the image. The ISP may further optimize a parameter such as exposure or a color temperature in a photographing scenario. In some embodiments, the ISP may be disposed in the camera 193.

The camera 193 is configured to capture a static image or a video. An optical image of an object is generated through the lens and is projected to the photosensitive element. The photosensitive element may be a charge coupled device (charge coupled device, CCD) phototransistor or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to: compress or decompress a digital video. The electronic device 100 may support one or more video codecs. In this case, the electronic device 100 may play or record videos in a plurality of coding formats, such as moving picture experts group (moving picture experts group, MPEG)-1, MPEG-2, MPEG-3, and MPEG-4.

The NPU is a neural-network (neural-network, NN) calculation processor, quickly processes input information by referring to a structure of a biological neural network, for example, by referring to a mode of transferring between neurons of a human brain, and may further continuously perform self-learning. An intelligent cognition application or the like of the electronic device 100 may be implemented by using the NPU, such as image recognition, facial recognition, speech recognition, or text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, a file such as music or a video is stored in the external storage card.

The internal memory 121 may be configured to store computer-executable program code. The executable program code includes instructions. The internal memory 121 may include a program storage area and a data storage area. The program storage area may store an operating system, an application program required by at least one function (such as a sound playing function or an image playing function), or the like. The data storage area may store data (such as audio data or a phone book) created in a process of using the electronic device 100, and the like. In addition, the internal memory 121 may include a high-speed random access memory, and may further include a nonvolatile memory, such as at least one magnetic disk storage device, a flash memory device, or a universal flash storage (universal flash storage, UFS). The processor 110 runs the instructions stored in the internal memory 121 and/or the instructions stored in the memory disposed in the processor, to execute various function applications and data processing of the electronic device 100.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earphone", is configured to convert an audio electrical signal into a sound signal. When a call is answered or speech information is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C by using the mouth of the user, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display screen 194. There are a plurality of types of pressure sensors 180A, such as a resistive pressure sensor, an inductive pressure sensor, and a capacitive pressure sensor. The capacitive pressure sensor may include at least two parallel plates made of conducting materials. When a force acts on the pressure sensor, capacitance between electrodes changes. The electronic device 100 determines pressure intensity based on a change in the capacitance. When a touch operation is performed on the display screen 194, the electronic device 100 detects intensity of the touch operation by using the pressure sensor 180A. The electronic device 100 may also calculate a location of the touch operation based on a detection signal of the pressure sensor 180A, for example, determine that the touch operation is located in a fingerprint recognition area. In some embodiments, touch operations that are performed at a same touch location but have different touch operation intensity may correspond to different operation instructions. For example, when a touch operation whose pressure value is less than a first pressure threshold is performed on a short message service message application icon, an instruction for viewing a short message service message is executed. When a touch operation whose pressure value is greater than or equal to the first pressure threshold is performed on the short message service message application icon, an instruction for creating a new short message service message is executed.

The touch sensor 180K is also referred to as a "touch device". In some embodiments, the touch sensor 180K may be disposed in the display screen 194, and the touch sensor 180K and the display screen 194 form a touchscreen, which is also referred to as a "touch screen". The touch sensor 180K is configured to detect a touch operation performed on or near the touch sensor. The touch sensor 180K may transfer the detected touch operation to the processor 110, to determine a touch event type. For example, when the display screen 194 displays a lock screen interface, the touch sensor 180K may transfer, to the AP, a detected touch operation performed on the fingerprint recognition area, and the AP may determine that a touch event type corresponding to the touch operation is fingerprint unlocking. The electronic device 100 may provide, by using the display screen 194, a visual output related to the touch operation. For example, the electronic device 100 displays, by using the display screen 194, the visual output related to the touch operation performed on the fingerprint recognition area: Brightness of the fingerprint recognition area is increased. In some other embodiments, the touch sensor 180K may also be disposed on a surface of the electronic device 100 at a location different from that of the display screen 194.

The fingerprint sensor 180H is configured to collect a fingerprint. In some embodiments, the fingerprint sensor 180H is disposed in the fingerprint recognition area of the display screen 194. In some other embodiments, the fingerprint sensor 180H is disposed under the fingerprint recognition area of the display screen 194. In some embodiments, the electronic device 100 may collect, by using the fingerprint sensor 180H, optical fingerprint information of a finger acting on the fingerprint recognition area. In some embodiments, the electronic device 100 may implement, by using a collected fingerprint feature, functions such as fingerprint unlocking, fingerprint payment, access to an application lock, fingerprint photographing, and answering an incoming call by using a fingerprint.

The ambient light sensor 180L is configured to sense brightness of ambient light. In some embodiments, the electronic device 100 may adaptively adjust brightness of the display screen 194 based on the sensed brightness of the ambient light. In some embodiments, when the DDIC in the display screen 194 controls brightness of the fingerprint recognition area, even if the brightness that is of the ambient light and that is sensed by the ambient light sensor changes, it is ensured that brightness of an area (a mask area for short) other than the fingerprint recognition area remains unchanged before and after the brightness of the fingerprint recognition area is adjusted.

The gyroscope sensor 180B may be configured to determine a motion posture of the electronic device 100. In some embodiments, angular velocities of the electronic device 100 around three axes (namely, the x-axis, the y-axis, and the z-axis) may be determined by using the gyroscope sensor 180B. The gyroscope sensor 180B may be configured to detect a lifting operation performed on the electronic device 100. For example, the electronic device 100 may display, in response to the lifting operation, a user interface used during fingerprint unlocking. The gyroscope sensor may be further configured to photograph an image stabilization scenario, a navigation scenario, and a motion sensing game scenario.

The acceleration sensor 180E may detect values of accelerations of the electronic device 100 in various directions (usually on three axes); may detect a value and a direction of gravity when the electronic device 100 is still; and may be further configured to identify a posture of the electronic device 100 (for example, whether the electronic device 100 is lifted), and is applied to an application such as optical fingerprint recognition, landscape/portrait orientation switching, or a pedometer.

The button 190 includes a power button, a volume button, or the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt, or may be configured to provide a touch vibration feedback. For example, touch operations performed on different applications (such as photographing and audio playing) may correspond to different vibration feedback effect. The motor 191 may also correspond to different vibration feedback effect for touch operations performed on different areas of the display screen 194. Different application scenarios (such as a time reminder, information receiving, an alarm clock, and a game) may also correspond to different vibration feedback effect. A touch vibration feedback effect may be alternatively user-defined.

The indicator 192 may be an indicator light, and may be configured to indicate a charging status or a change in a quantity of electricity, or may be configured to indicate a message, a missed call, a notification, or the like.

Figure 2:
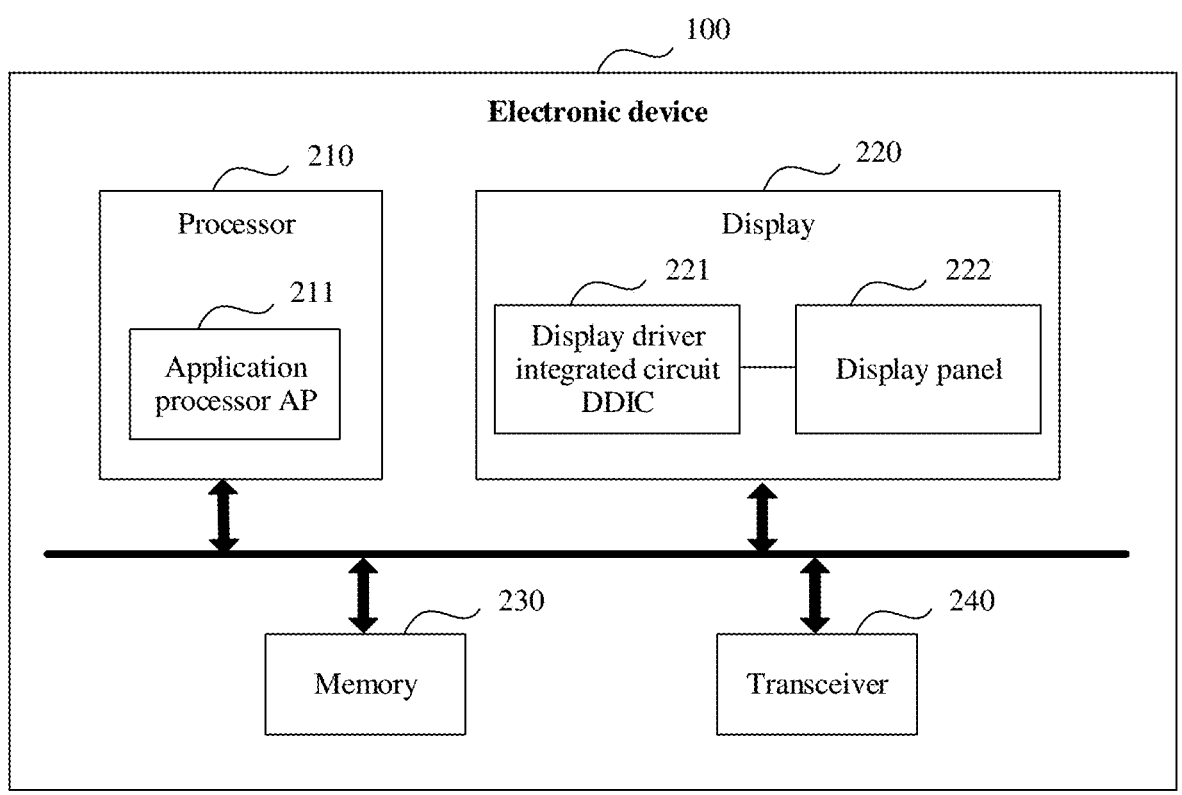

FIG. 2 is an example of a schematic diagram of a hardware structure of another electronic device 100.

As shown in FIG. 2, the electronic device 100 may include a processor 210, a display screen 220, a memory 230, and a transceiver 240. The processor 210 may include an application processor (AP) 211, and the display screen 220 may include a display driver integrated circuit (DDIC) 221 and a display panel 222. In some embodiments, the processor 210 may be the processor 110 shown in FIG. 1. Optionally, the processor 210 may include one or more APs 211. In some embodiments, the display screen 220 may be the display screen 194 shown in FIG. 1. Optionally, the display screen 220 may include one or more DDICs 221. In some embodiments, the memory 230 may include the external memory interface 120 and/or the internal memory 121 shown in FIG. 1. In some embodiments, the transceiver 240 may include at least one of the following: the antenna 1, the antenna 2, the mobile communication module 150, and a wireless communication module 160 that are shown in FIG. 1.

This application is not limited to the case shown in FIG. 2. In some other embodiments, the electronic device 100 may further include at least one module shown in FIG. 1. For details, refer to content in FIG. 1.

In this application, the electronic device 100 may implement optical fingerprint recognition. For example, during optical fingerprint recognition, a finger of a user generally acts on a fingerprint recognition area in the display panel 222, and may be illuminated by using light from the fingerprint recognition area. Reflected information of the light is detected at another receiving location (for example, a fingerprint sensor), to obtain optical fingerprint information. Therefore, during fingerprint recognition, brightness of the fingerprint recognition area is usually very high, for example, greater than brightness of another area (a mask area for short) in the display panel 222 except the fingerprint recognition area. However, before fingerprint recognition, brightness of the fingerprint recognition area is usually consistent with brightness of the mask area. Display effect that is of the fingerprint recognition area and that is obtained before fingerprint recognition is different from display effect that is of the fingerprint recognition area and that is obtained during fingerprint recognition. For example, a fingerprint icon is displayed in the fingerprint recognition area before fingerprint recognition, and a color of content displayed in the fingerprint recognition area during fingerprint recognition is white. Before fingerprint recognition and during fingerprint recognition, display effect of the mask area remains unchanged. For example, displayed content remains unchanged.

In this application, if brightness of the fingerprint recognition area is greater than or equal to a preset brightness value, for example, greater than or equal to 800 nits (nit), the fingerprint recognition area may be referred to as being highlighted. If the brightness of the fingerprint recognition area is greater than or equal to the preset brightness value, and is greater than brightness of the mask area, the fingerprint recognition area may be referred to as being partially highlighted.

Currently, an image drawn by the AP 211 may be sent to the DDIC 221 through a communication interface (for example, an MIPI), and the DDIC 221 controls the display panel 222 to perform display. The drawn image is, for example, an image displayed by the display screen 220 during optical fingerprint recognition. The electronic device 100 may include a plurality of APs 211, and the plurality of APs 211 may belong to different manufacturers or different platforms. The electronic device generally includes the display screen 220 from only one manufacturer. In different scenarios, the electronic device 100 may draw the image by using different APs 211. For example, during fingerprint unlocking and fingerprint payment, APs for drawing images are different. In this case, it is likely that display effect that is of the mask area and that is obtained before fingerprint recognition is different from display effect that is of the mask area and that is obtained during fingerprint recognition, thereby leading to poor user experience.

In this application, the AP 211 may send indication information to the DDIC 221 through the communication interface (for example, an MIPI), so that the DDIC 221 controls the brightness of the fingerprint recognition area and the brightness of the mask area. The display panel 222 may display, under control of the DDIC 221, an image used during fingerprint recognition. It may also be understood that the AP 211 indicates the DDIC 221 to partially highlight the fingerprint recognition area. The image used during fingerprint recognition does not need to be drawn by the AP 211, and does not depend on a manufacturer or a platform of the AP 211. Therefore, display effect is relatively good, thereby improving user experience.

Figure 3:
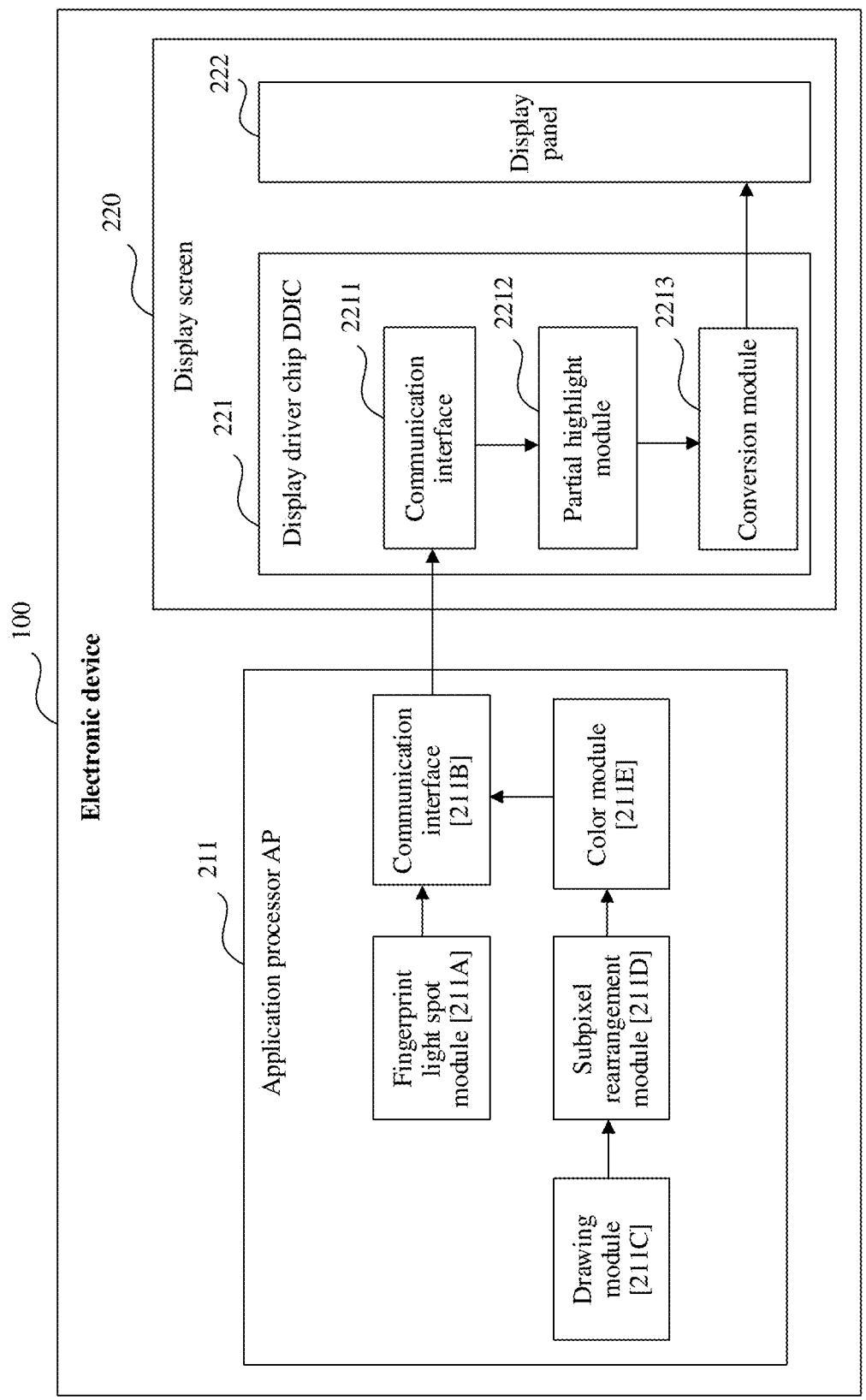

In some embodiments, the AP 211 may include a fingerprint light spot module 211A, a communication interface 211B, a drawing module 211C, a sub-pixel rearrangement (sub-pixel rearrangement, SPR) module 211D, and a color module 211E. The DDIC 221 of the display screen 220 may include a communication interface 2211, a partial highlight module 2212, and a conversion module 2213. For details, refer to an electronic device 100 shown in FIG. 3. FIG. 3 shows only the AP 211 and the display screen 220. For other modules, refer to the descriptions in FIG. 1 and FIG. 2.

The fingerprint light spot module 211A may be configured to determine first indication information. The first indication information is used to indicate the DDIC 221 to determine the image used during fingerprint recognition. The fingerprint light spot module 211A may be configured to determine a parameter for partially highlighting the fingerprint recognition area. In some embodiments, the parameter may include an alpha (alpha) value used to reduce a grayscale of the mask area. A value range of the alpha value is [0, 1]. A smaller value indicates stronger grayscale reduction effect. The alpha value may be used by the DDIC 221 to control the brightness of the mask area, so that the display effect of the mask area remains unchanged (for example, displayed content and the brightness remain unchanged) before fingerprint recognition and during fingerprint recognition. In some embodiments, the parameter may include a brightness code of the fingerprint recognition area. The brightness code may be used to indicate a brightness value of the fingerprint recognition area. This application is not limited thereto. The brightness code may be further used to indicate a parameter of the fingerprint recognition area, such as a quantity, a size, a location, a shape, or a color. The brightness code may be used by the DDIC 221 to control the brightness of the fingerprint recognition area, so that the fingerprint recognition area is highlighted during fingerprint recognition. In this case, the electronic device 100 may collect the optical fingerprint information of the finger performing the touch operation on the fingerprint recognition area.

The communication interface 211B may be an MIPI interface. This application is not limited thereto. In some other embodiments, the communication interface 211B may also be another communication interface, for example, a high definition multimedia interface (high definition multimedia interface, HDMI). The communication interface 211B may be configured to send data and/or an instruction to the DDIC 221, such as the first indication information determined by the fingerprint light spot module 211A, the parameter for partially highlighting the fingerprint recognition area, or the image determined by the drawing module 211C (the image is transmitted to the communication interface 211B after being processed by the SPR module 211D and the color module 211E).

The drawing module 211C may be configured to draw the image, and the drawn image is sent to the display screen 220 for display. For example, the drawing module 211C may draw the image (for example, an image including animation effect of fingerprint unlocking) used during fingerprint recognition. For a specific example, refer to FIG. 6. The drawing module 211C may also draw an image (for example, a lock screen interface) used before fingerprint recognition and an image (such as a desktop of the electronic device 100 or an interface of an application program) used after fingerprint recognition.

The SPR module 211D may be configured to perform SPR processing on the image obtained by the drawing module 211C. In some embodiments, pixels inside the display panel may not be arranged in a real (real) RGB color model (red green blue, RGB). One pixel includes three sub-pixels: R, G, and B, that is, the three sub-pixels that are R, G, and B are separately lit, and the pixel is displayed in white. One pixel inside the display panel may include at least one of the three sub-pixels: R, G, and B. For example, one pixel 1 includes one R sub-pixel and one G sub-pixel, and another pixel 2 includes one B sub-pixel and one G pixel. The SPR processing may implement "supplying", by "borrowing" the B sub-pixel of the pixel 2, a B pixel missing in the pixel 1, and lighting the B sub-pixel of the pixel 2 to form a white pixel 1. Therefore, the SPR processing can be performed to reduce a quantity of image data transmitted between the AP 211 and the DDIC 221, thereby reducing a transmission bandwidth and power consumption. It may be understood that, compared with the DDIC 221 with a 40 nm (nm) process, the AP 211 uses a better process, such as 7 nm or 5 nm. Power consumption of an SPR algorithm running on an AP 211 side is lower than power consumption of the SPR algorithm running on a DDIC 221 side, and one electronic device 100 can meet a requirement by using one set of SPR algorithms. Therefore, the SPR algorithm usually runs on the AP 211 side to save power consumption of the electronic device (in this way, a battery capacity of about 100 milliampere-hours (mAh) can be saved in one day). However, after the image that is obtained by the drawing module 211C and that is used during fingerprint recognition is processed by the SPR module 211D, there is a clear boundary of grayscale transition of an image in the mask area, that is, both relatively low power consumption and relatively good display effect obtained during optical fingerprint recognition cannot be ensured.

The color module 211E may be configured to implement a display mode such as an eye protection mode or a bright mode of the electronic device 100. When the display modes are enabled, the color module 211E may process the image obtained by the drawing module 211C, for example, adjust brightness or adjust a color. However, after the image that is obtained by the drawing module 211C and that is used during fingerprint recognition is processed by the color module 211E, a serious color cast and serious grayscale transition occur in the image in the mask area, thereby leading to relatively poor display effect. If the mode such as the eye protection mode or the bright mode is disabled during fingerprint recognition, and is enabled after the fingerprint recognition is completed, a sensitive user may sense screen flickering, an abrupt hue change, or the like. Consequently, a public opinion from the user is caused.

The communication interface 2211 of the DDIC 221 is similar to the communication interface 211B of the AP 211. The communication interface 2211 may be configured to receive data and/or an instruction sent by another apparatus (for example, the AP 211). In some embodiments, the DDIC 221 may receive the image that is determined by the drawing module 211C and that is sent by the AP 211, and control the display panel 222 to perform display. In some other embodiments, the DDIC 221 may receive the first indication information that is determined by the fingerprint light spot module 211A and that is sent by the AP 211, and optionally the parameter for partially highlighting the fingerprint recognition area, and transmit the first indication information and the parameter to the partial highlight module 2212 for processing. In some embodiments, the first indication information determined by the fingerprint light spot module 211A, and optionally the parameter for partially highlighting the fingerprint recognition area may be directly transmitted to the DDIC 221 through the communication interface 211B. This may be understood as that the SPR module 211D and the color module 211E are bypassed (bypass).

The partial highlight module 2212 may be configured to determine, in response to the first indication information sent by the AP 211, the image used during fingerprint recognition. In some embodiments, the partial highlight module 2212 may control both the brightness of the fingerprint recognition area and the brightness of the mask area in response to the first indication information, to avoid occurrence of screen flickering. In some embodiments, the image that is determined by the partial highlight module 2212 and that is used during fingerprint recognition may be transmitted to the conversion module 2213. The conversion module 2213 may be configured to process a to-be-displayed image, to convert the to-be-displayed image into a signal for controlling display on the display panel 222. The signal may be transmitted to the display panel 222, so that the display panel 222 displays the to-be-displayed image, for example, the image used during fingerprint recognition.

Figure 4:
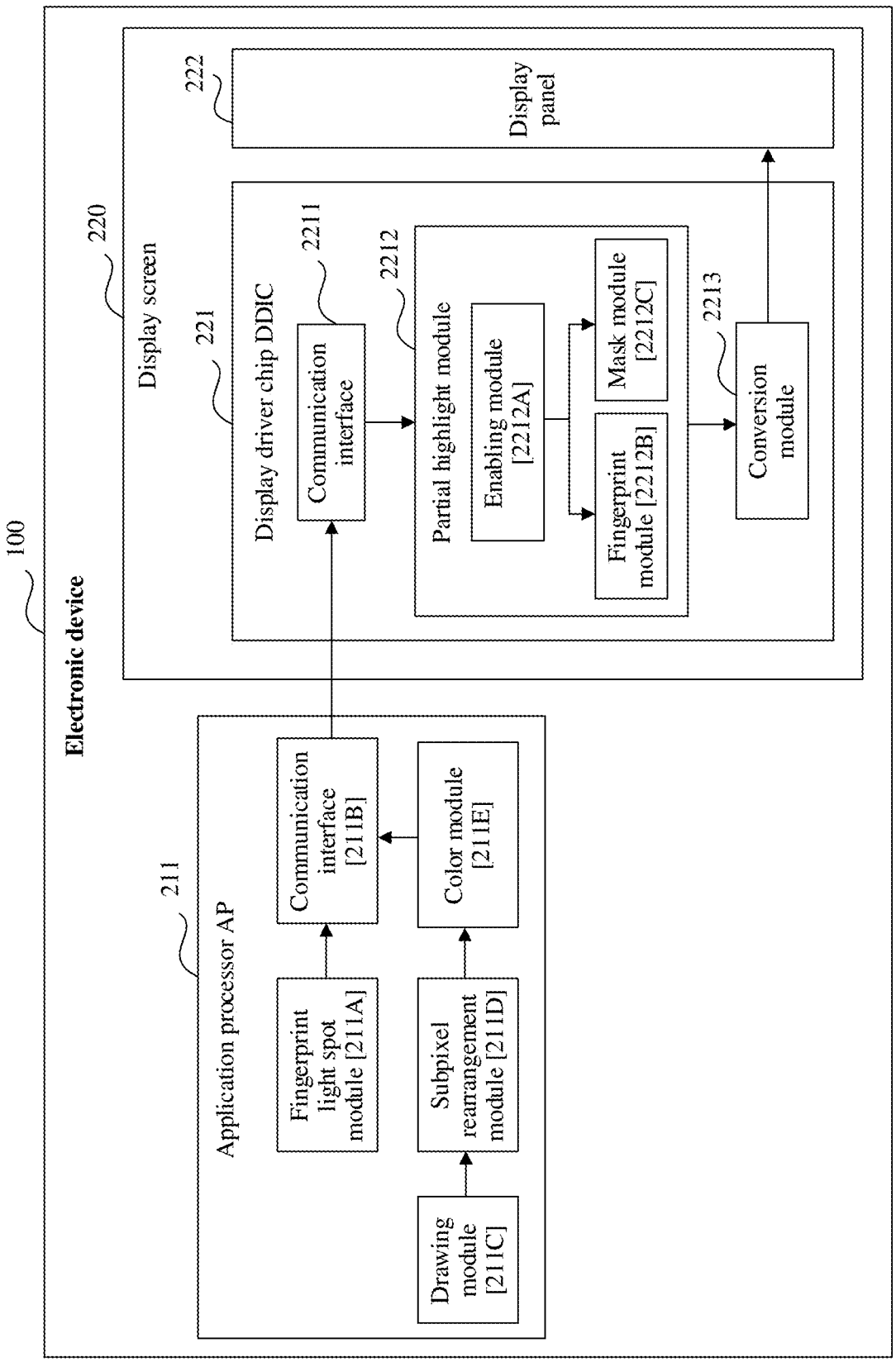

In some embodiments, the partial highlight module 2212 may include an enabling module 2212A, a fingerprint module 2212B, and a mask module 2212C. For details, refer to an electronic device 100 shown in FIG. 4.

The enabling module 2212A may be configured to: indicate, based on the first indication information sent by the AP 211, the fingerprint module 2212B to control the brightness of the fingerprint recognition area, and indicate the mask module 2212C to control the brightness of the mask area, to determine the image used during fingerprint recognition. In some embodiments, when sending the first indication information, the AP 211 may send address information of the enabling module 2212A together. Optionally, the first indication information may be written into the enabling module 2212A corresponding to the address information. For example, when the first indication information is written into the enabling module 2212A, a bit (bit) of the enabling module 2212A may be set to 1. This may be understood as setting a corresponding hardware circuit to a high level, and may be understood as enabling a function of partially highlighting the fingerprint recognition area.

The fingerprint module 2212B may be configured to control the brightness of the fingerprint recognition area. This application is not limited thereto. The fingerprint module 2212B may further control display effect of the fingerprint recognition area, such as a quantity, a size, a location, a shape, or a color. In some embodiments, the fingerprint module 2212B may control the brightness of the fingerprint recognition area based on an enabling signal sent by the enabling module 2212A. In some other embodiments, the fingerprint module 2212B may control the brightness of the fingerprint recognition area based on the first indication information sent by the AP 211.

In some embodiments, the fingerprint module 2212B may control the brightness of the fingerprint recognition area based on the brightness code that is of the fingerprint recognition area and that is sent by the AP 211. Optionally, when sending the brightness code of the fingerprint recognition area, the AP 211 sends address information of the fingerprint module 2212B together. Optionally, the brightness code may be written into the fingerprint module 2212B corresponding to the address information. Optionally, the brightness code may include an enabling signal of the fingerprint module 2212B. When the brightness code is written into the fingerprint module 2212B, the fingerprint module 2212B may be enabled to control the brightness of the fingerprint recognition area. For example, when the brightness code is written into the fingerprint module 2212B, a bit of the fingerprint module 2212B may be set to 1. This may be understood as enabling a function of controlling display of the fingerprint recognition area. Optionally, the brightness code may be used to indicate the brightness value of the fingerprint recognition area. For example, a brightness code 1110 indicates that a brightness value is 800 nits, and a brightness code 1111 indicates that a brightness value is 850 nits. This application is not limited thereto. The brightness code may be further used to indicate another parameter of the fingerprint recognition area, such as a quantity, a size, a location, a shape, or a color.

In some other embodiments, the fingerprint module 2212B may control the brightness of the fingerprint recognition area based on preconfigured brightness of the fingerprint recognition area. This application is not limited thereto. Another parameter such as a quantity, a size, a location, a shape, or a color may be further preconfigured. Display of the fingerprint recognition area may be controlled based on the preconfigured parameter of the fingerprint recognition area.

In some embodiments, that the fingerprint module 2212B controls the brightness of the fingerprint recognition area is specifically setting a grayscale and a display brightness value (display brightness value, DBV) of a pixel in the fingerprint recognition area. It is assumed that a brightness value of the pixel used when the fingerprint recognition area is highlighted is 900 nits, and a DBV corresponding to the 900 nits is a first threshold. When the fingerprint module 2212B controls the fingerprint recognition area to be highlighted, the DBV may be set to the first threshold, and the grayscale may be set to a second threshold. Optionally, the DBV corresponding to the brightness value of the pixel used when the fingerprint recognition area is highlighted is usually a maximum value. For example, a value of the DBV is 0 to 4095, and the first threshold is 4095. Optionally, generally, when the fingerprint recognition area is highlighted, a grayscale of a pixel is set to a maximum value. For example, a value of the grayscale is 0 to 255, and the second threshold is 255. Optionally, generally, when grayscales of pixels in the fingerprint recognition area are all set to the maximum value, a color of an image in the fingerprint recognition area is white.

When the fingerprint module 2212B controls the brightness of the fingerprint recognition area, that the display panel 222 displays the image used during fingerprint recognition may be understood as that the fingerprint module 2212B controls display brightness that is of the fingerprint recognition area and that is used when the display panel 222 displays the image used during fingerprint recognition.

The mask module 2212C may be configured to control the brightness of the mask area. In some embodiments, the mask module 2212C may control the brightness of the mask area based on the enabling signal sent by the enabling module 2212A. In some other embodiments, the mask module 2212C may control the brightness of the mask area based on the first indication information sent by the AP 211.

In some embodiments, the mask module 2212C may control the brightness of the mask area based on the alpha value sent by the AP 211. In some other embodiments, the mask module 2212C may determine the alpha value by itself, and control the brightness of the mask area based on the alpha value determined by itself. In some other embodiments, the mask module 2212C may preconfigure an alpha value (for example, 1, which may be understood as that brightness and colors of the image that are used before and after the grayscale is reduced remain unchanged), and may control the brightness of the mask area based on the preconfigured alpha value.

When the mask module 2212C controls the brightness of the mask area, that the display panel 222 displays the image used during fingerprint recognition may be understood as that the mask module 2212C controls display brightness that is of the mask area and that is used when the display panel 222 displays the image used during fingerprint recognition.

In some embodiments, that the mask module 2212C controls the brightness of the mask area is specifically: reducing the grayscale (for example, reducing the brightness or darkening a color) of the image in the mask area, so that display effect of the image (which may be referred to as a display mask) that is in the mask area and that is used when the display panel 222 displays the image used during fingerprint recognition is consistent with display effect of the image (which may be referred to as a reference mask) that is in the mask area and that is used when the display panel 22 displays the image used before fingerprint recognition. For example, image content, brightness, and frame rates are the same. The frame rate may be understood as a quantity of frames of an image that are displayed per second, and a unit is Hertz (Hz). For example, the mask module 2212C may first process the reference mask (for example, increase brightness), and then multiply a grayscale of the processed image in the mask area by the alpha value, to obtain a grayscale of the display mask. A range of the alpha value is [0, 1]. A smaller alpha value indicates stronger grayscale reduction effect. Alternatively, the mask module 2212C may not process the reference mask, but directly use the reference mask as the display mask (which may be understood as that the alpha value is equal to 1).

In some embodiments, the mask module 2212C may reduce the grayscale of the image in the mask area based on the alpha value sent by the AP 211. Optionally, when sending the alpha value, the AP 211 sends address information of the mask module 2212C together. Optionally, when sending the alpha value, the AP 211 sends an enabling signal of the mask module 2212C together. Optionally, the enabling signal may be written into the mask module 2212C corresponding to the address information. For example, when the enabling signal is written into the mask module 2212C, a bit of the mask module 2212 may be set to 1, which may be understood as enabling a function of controlling display of the mask area. Optionally, the alpha value may be written into the mask module 2212C corresponding to the address information. For example, when the alpha value is written into the mask module 2212C, the mask module 2212C may reduce the grayscale of the reference mask by using the alpha value, to ensure that display effect of the display mask is the consistent with that of the reference mask.

It may be understood that any module included in the foregoing example of the electronic device 100 may be a hardware module or a software module. Any one of the foregoing modules may be an independent module, and at least one of the foregoing modules may be integrated together.

This application is not limited to the foregoing example of the structure. In some other embodiments, the AP may include a processor, a memory, and a communication interface. In some other embodiments, the DDIC may include a processor, a memory, and a communication interface. The processor includes, for example, one or more CPUs. When the processor includes one CPU, the CPU may be a single-core CPU, or may be a multi-core CPU. The memory includes, but is not limited to, a random access memory (random access memory, RAM), a read-only memory (read-only memory, ROM), an erasable programmable read-only memory (erasable programmable read only memory, EPROM), or a compact disc read-only memory (compact disc read-only memory, CD-ROM). The memory is configured to store a related computer program and data. The communication interface is configured to receive and/or send information, for example, is configured to transmit an instruction and/or data between the AP and the DDIC.

In some embodiments, the AP 211 may include a GPU and a display subsystem (display subsystem, DSS). The GPU may be configured to perform drawing and rendering calculation on image data, to generate a to-be-displayed image. The GPU may also be referred to as a display core or a visual processor, is a microprocessor that performs an image operation, and may include a 2D (dimension, Dimension) and/or 3D processing function. The DSS may be connected to the display screen to display the to-be-displayed image generated by the CPU or GPU. Different from pixel-level processing on the image to be specifically displayed by the GPU, the device performs desktop-level display processing, such as image scaling (a size change), direction flipping, brightness and contrast adjustment, or overlaying (overlay) of a plurality of layers or windows. For example, in the AP 211 shown in FIG. 3 and FIG. 4, both the fingerprint light spot module 211A and the drawing module 211C may be integrated into the GPU, and both the SPR module 211D and the color module 211E may be integrated into the DSS.

In some embodiments, the memory of the DDIC 221 may include one or more registers. Specific examples are as follows.

Example 1: In the DDIC 221 shown in FIG. 4, the partial highlight module 2212 may be one register, and the enabling module 2212A, the fingerprint module 2212B, and the mask module 2212C may be submodules with different addresses in the one register.

Example 2: In the DDIC 221 shown in FIG. 4, the enabling module 2212A, the fingerprint module 2212B, and the mask module 2212C may be different registers with different addresses in the memory.

Example 3: In the DDIC 221 shown in FIG. 4, the enabling module 2212A and the fingerprint module 2212B may be submodules with different addresses in one register.

Example 4: In the DDIC 221 shown in FIG. 4, the enabling module 2212A and the mask module 2212C may be submodules with different addresses in one register.

It may be understood that the electronic device 100 may receive a user operation for triggering display of the image used during fingerprint recognition, and may determine, in response to the user operation, the image used during fingerprint recognition, and control the display screen 220 to perform display. The foregoing user operation is, for example, but is not limited to, a touch operation that is performed on the display screen and that is detected by a pressure sensor and/or a touch sensor, a touch operation that is performed on the fingerprint recognition area and that is detected by the pressure sensor and/or the touch sensor, and a lifting operation detected by an acceleration sensor and/or a gyroscope sensor. If the AP 211 draws the image used during fingerprint recognition, for example, the drawing module 211C draws the image used during fingerprint recognition, the image is processed by the SPR module 211D and the color module 211E, thereby causing poor actual display effect of the mask area. However, in this application, the fingerprint light spot module 211A may directly send the first indication information to the DDIC 221 through the communication interface 211B, and the DDIC 221 determines the image used during fingerprint recognition. The image does not need to pass through the SPR module 211D. Therefore, both relatively low power consumption and relatively good display effect of the mask area can be ensured. The image also does not need to pass through the color module 211E. In this case, it can be ensured that the display mode such as an eye protection mode or a bright mode is enabled during fingerprint recognition, thereby avoiding a public opinion from a user, and also ensuring relatively good display effect of the mask area. In addition, in this application, a processing procedure on an AP side is further simplified, and a recognition speed is increased. For a specific example, refer to FIG. 5.

Figure 5:
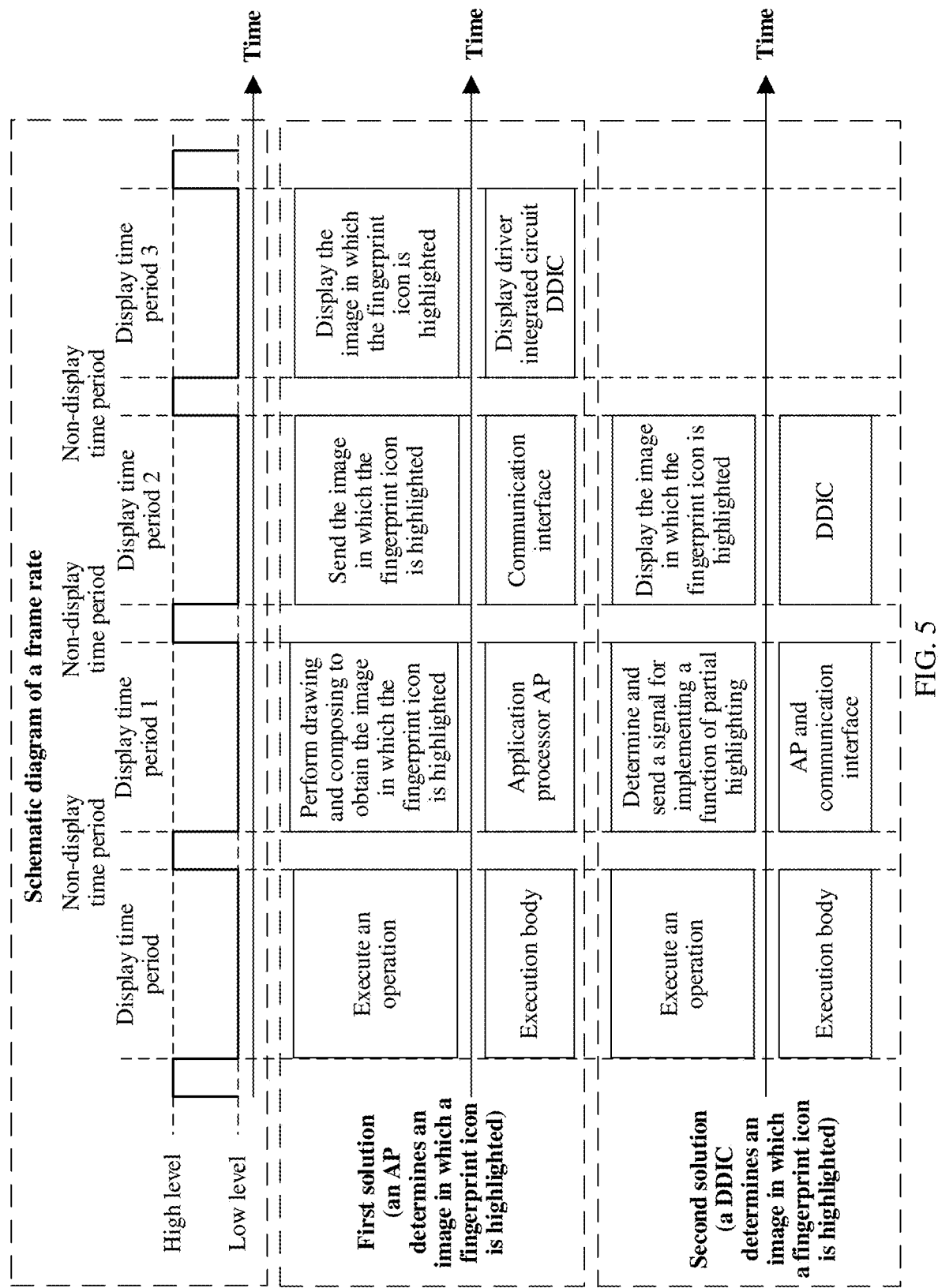
FIG. 5 is a schematic diagram of a process of displaying an image in which a fingerprint icon is highlighted according to an embodiment of this application.

FIG. 5 is an example of a schematic diagram of a processing procedure.

As shown in FIG. 5, in a schematic diagram of a frame rate, a horizontal axis represents time, and a vertical axis represents level value. A high level represents a non-display state, a low level represents a display state, and the high level and the low level alternately occur. Therefore, the time represented by the horizontal axis may include a plurality of display time periods (time periods in which the level value is at the low level) and a plurality of non-display time periods (time periods in which the level value is at the high level). The display time periods periodically occur. One display period may be understood as a time period in which the display screen displays a current frame of image, and one non-display time period may be understood as a time period in which the display screen displays no image or displays a previous displayed frame of image. For example, if the frame rate is 90 hz, one display time period is 1/90 seconds, in other words, 11.1 milliseconds (ms). When the frame rate is 120 hz, one display time period is 1/120 seconds, in other words, 8.3 ms.

As shown in FIG. 5, a first solution (that is, the AP determines the image used during fingerprint recognition) needs to be implemented in three display time periods. Specifically, first, in a display time period 1, the AP performs drawing and composing to obtain the image used during fingerprint recognition (for a specific process example, refer to FIG. 6). Then, in a display time period 2, the AP sends the image used during fingerprint recognition to the DDIC through the communication interface (for example, an MIPI). Finally, in a display time period 3, the DDIC controls the display panel to display the image used during fingerprint recognition. In the first solution, the image that is drawn by the AP and that is used during fingerprint recognition needs to be sent to the display screen for display until a next frame. However, a second solution (that is, the DDIC determines the image used during fingerprint recognition) in this application needs to be implemented by using only two display time periods. Specifically, first, in the display time period 1, the AP determines the first indication information and optionally the parameter for partially highlighting the fingerprint recognition area, and sends the first indication information and optionally the parameter for partially highlighting the fingerprint recognition area to the DDIC through the communication interface (for example, an MIPI). Then, in the display time period 2, the DDIC controls the brightness of the fingerprint recognition area in the display panel based on the first indication information (optionally the foregoing parameter), and controls the brightness of the mask area, that is, controls the display panel to display the image used during fingerprint recognition. In this application (in other words, in the second solution), a process of performing drawing and composing to obtain the image used during fingerprint recognition is not required, so that duration of one frame is saved, the processing procedure on the AP side is simplified, and availability is higher.

Figure 6:
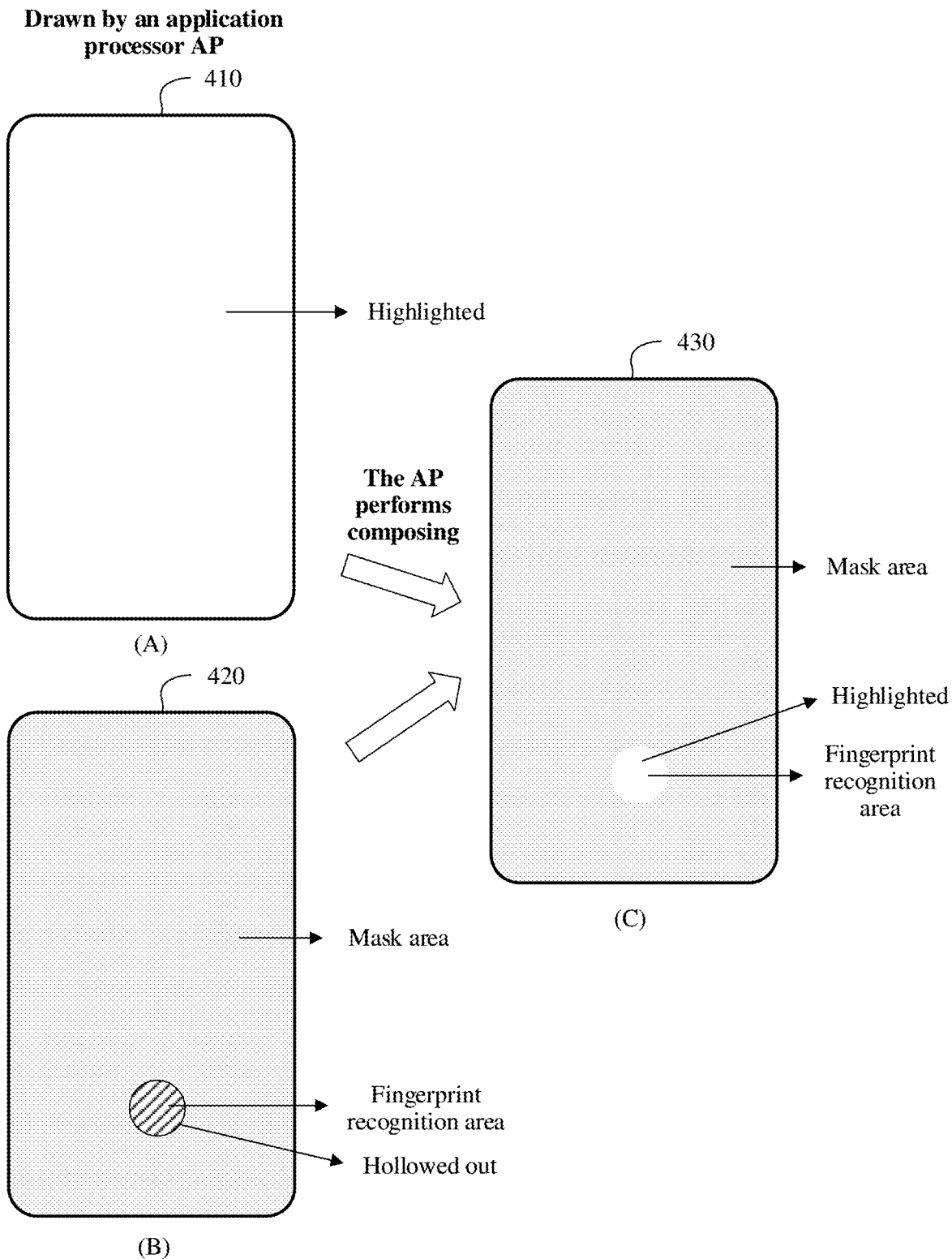
FIG. 6 is a schematic diagram of a process of determining an image in which a fingerprint icon is highlighted.

FIG. 6 is an example of a process in which an AP performs drawing and composing to obtain an image used during fingerprint recognition. In some embodiments, the process may be implemented by the drawing module 211C of the AP 211 shown in FIG. 3 and FIG. 4. In some embodiments, the process may be implemented by a GPU included in the AP.

As shown in (A) in FIG. 6, the AP may first draw a frame of a full-screen highlighted image 410, that is, full-screen brightness is greater than or equal to a preset brightness value. In some embodiments, in addition to the brightness, other display effect of the image 410 may be the same as display effect of an image displayed before fingerprint recognition. For example, display parameters are the same, such as hues. As shown in (B) in FIG. 6, the AP may first draw a frame of an image 420 in which the fingerprint recognition area is hollowed out. Herein, "that the fingerprint recognition area is hollowed out" is actually that no display parameter of the fingerprint recognition area is set. If a display screen displays the image 420, the fingerprint recognition area may be in an all-black state. In some embodiments, display effect of a mask area in the image 420 may be the same as display effect of a mask area in an image used before fingerprint recognition. For example, display parameters are the same, such as brightness or hues.

Then, the AP may compose the image 410 and the image 420 to obtain an image 430 used during fingerprint recognition. Details are shown in (C) in FIG. 6. For example, the AP may place the image 410 under the image 420 (a size of the image 410 is the same as a size of the image 420), and the image 410 completely overlaps the image 420.

As shown in (C) in FIG. 6, if brightness of a fingerprint recognition area in the image 430 is greater than or equal to a preset brightness value, and is greater than brightness of a mask area, the fingerprint recognition area may be referred to as being partially highlighted. Display effect of the mask area in the image 430 may be the same as the display effect of the mask area in the image 420. For example, display parameters are the same, such as brightness or hues. The image 430 may be transmitted by the AP to a DDIC through a communication interface, and the DDIC controls the display panel to perform display, to implement optical fingerprint recognition.

This application is not limited to the example shown in FIG. 6. In some other embodiments, the AP further draws animation effect of fingerprint unlocking in the fingerprint recognition area and a nearby area (located in the mask area).

The following describes an example of an application scenario used in this application.

Figure 7A:
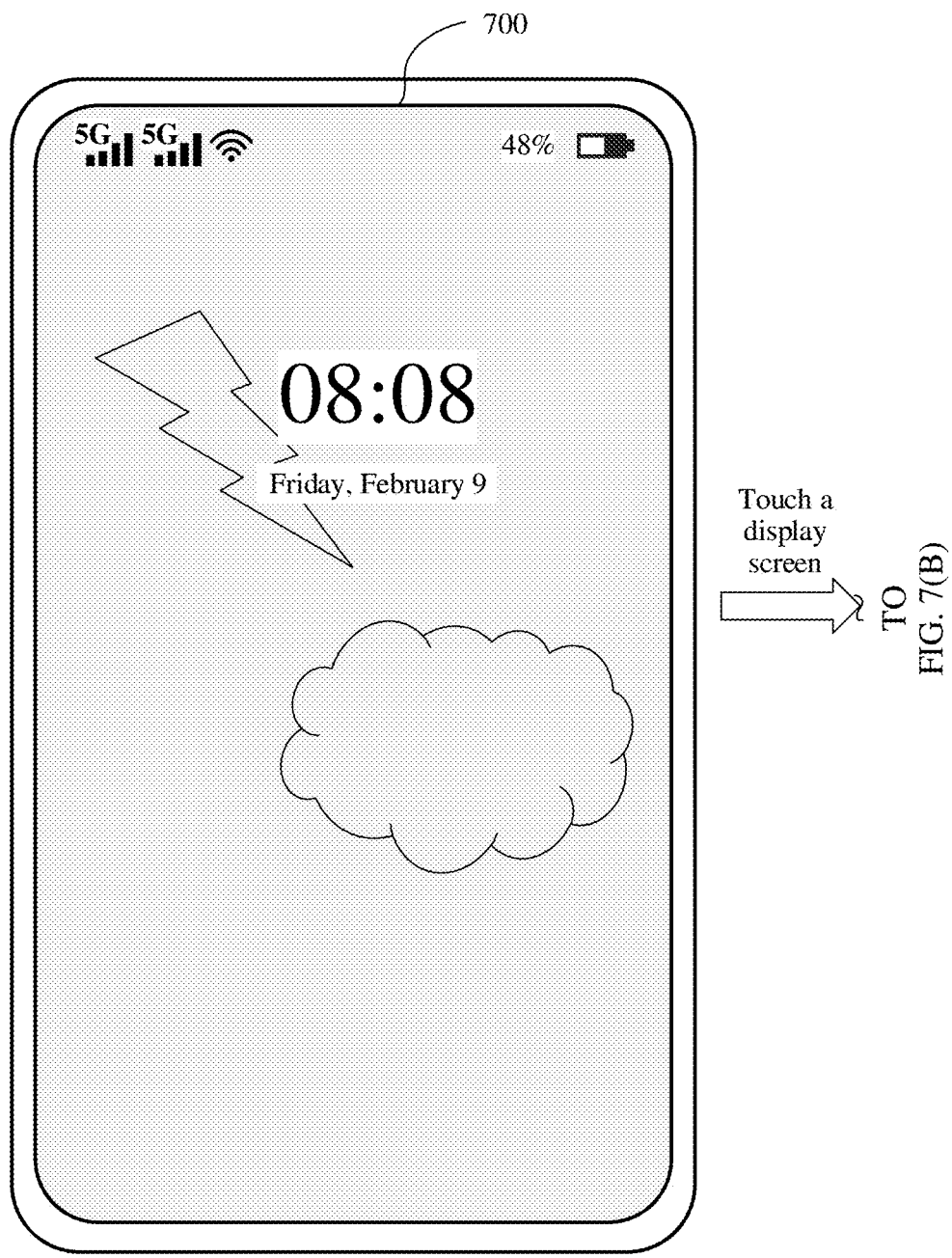
FIG. 7(A), FIG. 7(B), FIG. 7(C), FIG. 8(A), FIG. 8(B), and FIG. 8(C) are schematic diagrams of embodiments of some user interfaces according to embodiments of this application.
Figure 7B:
Figure 7C:

FIG. 7(A), FIG. 7(B), and FIG. 7(C) are examples of schematic diagrams of user interfaces for fingerprint unlocking.

As shown in FIG. 7(A), an electronic device may display a user interface 700. In some embodiments, the user interface 700 may be a lock screen interface. The electronic device may receive a user operation (for example, a lifting operation or a touch operation performed on a display screen). In response to the user operation, the electronic device may display a fingerprint icon in a fingerprint recognition area 701 in the display screen. A specific example is shown in FIG. 7(B). The foregoing user operation may be understood as being used to trigger fingerprint unlocking.

As shown in FIG. 7(B), brightness of a fingerprint recognition area 701 is the same as brightness of a mask area in a user interface 700 except the fingerprint recognition area 701. The electronic device may receive a user operation (for example, a touch operation) performed on the fingerprint recognition area 701. In response to the user operation, the electronic device may control the brightness of the fingerprint recognition area 701. A specific example is shown in FIG. 7(C). Each of the user interface 700 shown in FIG. 7(A) and the user interface 700 shown in FIG. 7(B) may be referred to as a user interface used before fingerprint recognition.

As shown in FIG. 7(C), brightness of a fingerprint recognition area 701 is greater than or equal to a preset brightness value, and is greater than brightness of a mask area in a user interface 700 except the fingerprint recognition area 701. In this case, the electronic device may collect, by using light provided by the fingerprint recognition area 701, optical fingerprint information of a finger acting on the fingerprint recognition area 701. The user interface 700 shown in FIG. 7(C) may be referred to as a user interface used during fingerprint recognition.

In some embodiments, the user interface 700 may display fingerprint unlocking prompt information 702. For example, "Do not move a finger away during fingerprint recognition". A user may learn, by using the prompt information 702, that the electronic device is currently recognizing a fingerprint of the user. The electronic device may identify a user identity based on the optical fingerprint information. For example, preconfigured optical fingerprint information is compared with the collected optical fingerprint information. If a similarity (for example, a proportion of a same part in all content) is greater than or equal to a preset similarity value, it is determined that identification succeeds (it is determined that a current user is an authorized user). In this case, the electronic device may display a desktop, a user interface of an application program, or the like. If a similarity is less than a preset similarity value, it is determined that identification fails (it is determined that a current user is an unauthorized user). In this case, the electronic device may keep displaying a lock screen interface. The prompt information 702 may be used to indicate a recognition result. For example, "Fingerprint recognition fails. Please try again." In some other embodiments, the user interface 700 shown in FIG. 7(C) may alternatively not include the prompt information 702.

In some other embodiments, after displaying the user interface 700 shown in FIG. 7(A), the electronic device may alternatively and directly display the user interface 700 shown in FIG. 7(C), instead of displaying the user interface 700 shown in FIG. 7(B). In some other embodiments, the electronic device may alternatively and directly display the user interface 700 shown in FIG. 7(B) and the user interface 700 shown in FIG. 7(C), instead of displaying the user interface 700 shown in FIG. 7(A).

Figure 8A:
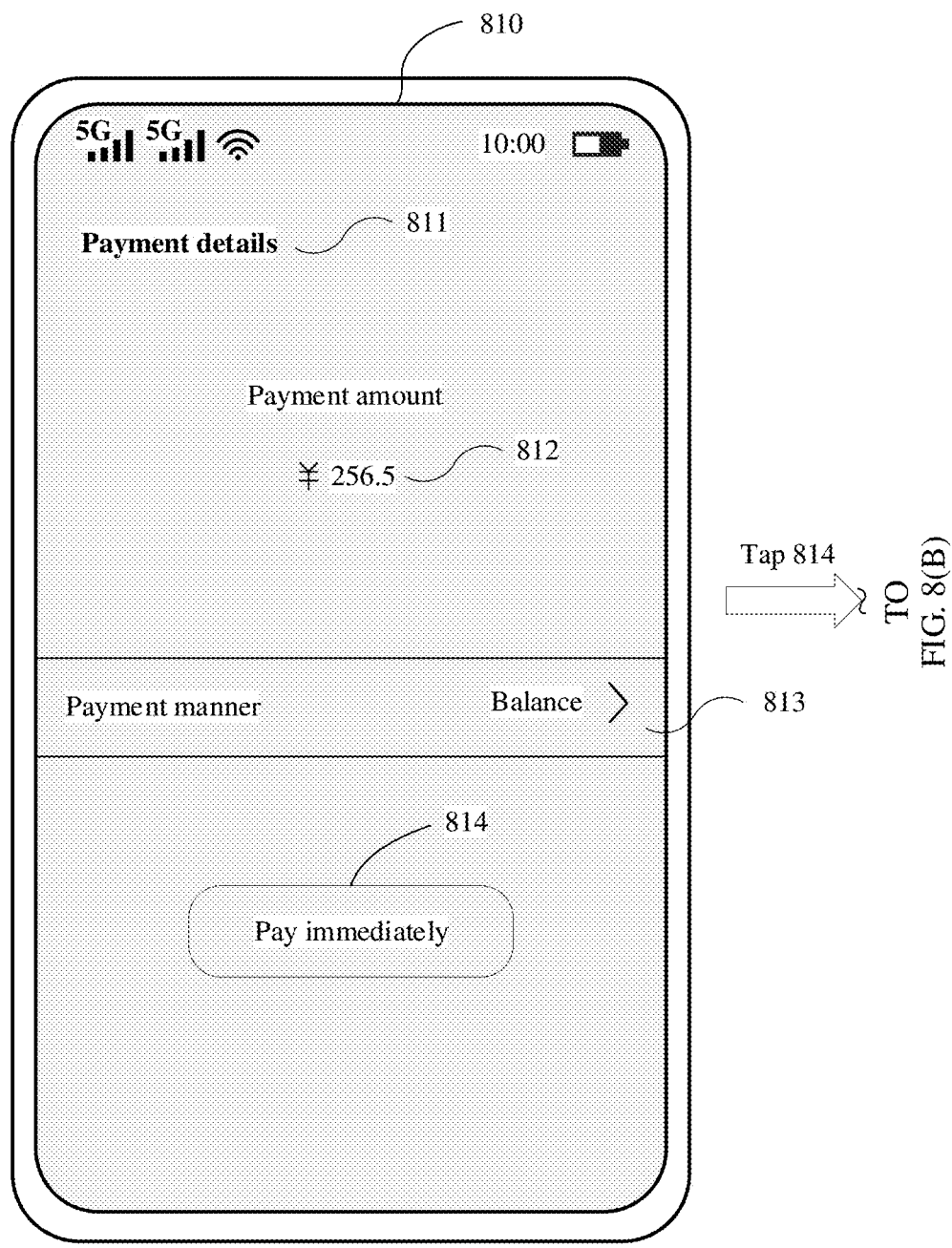
Figure 8B:
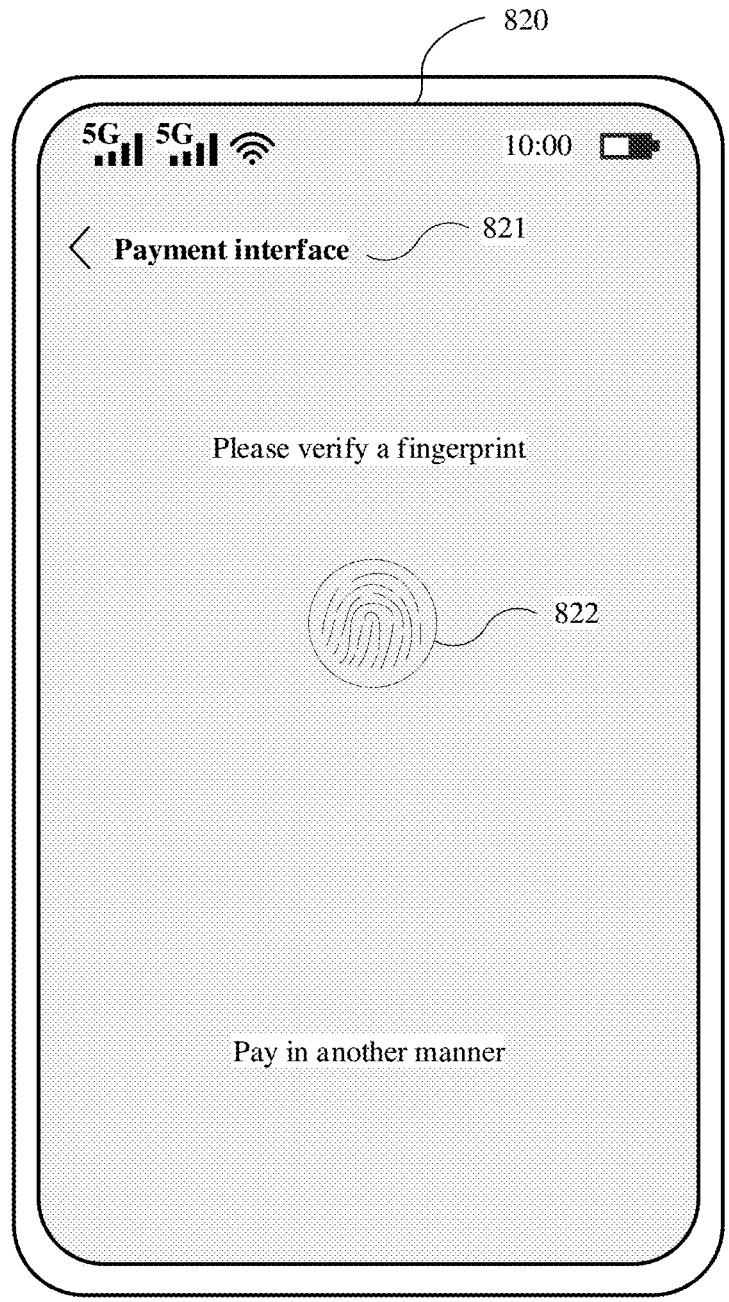
Figure 8C:
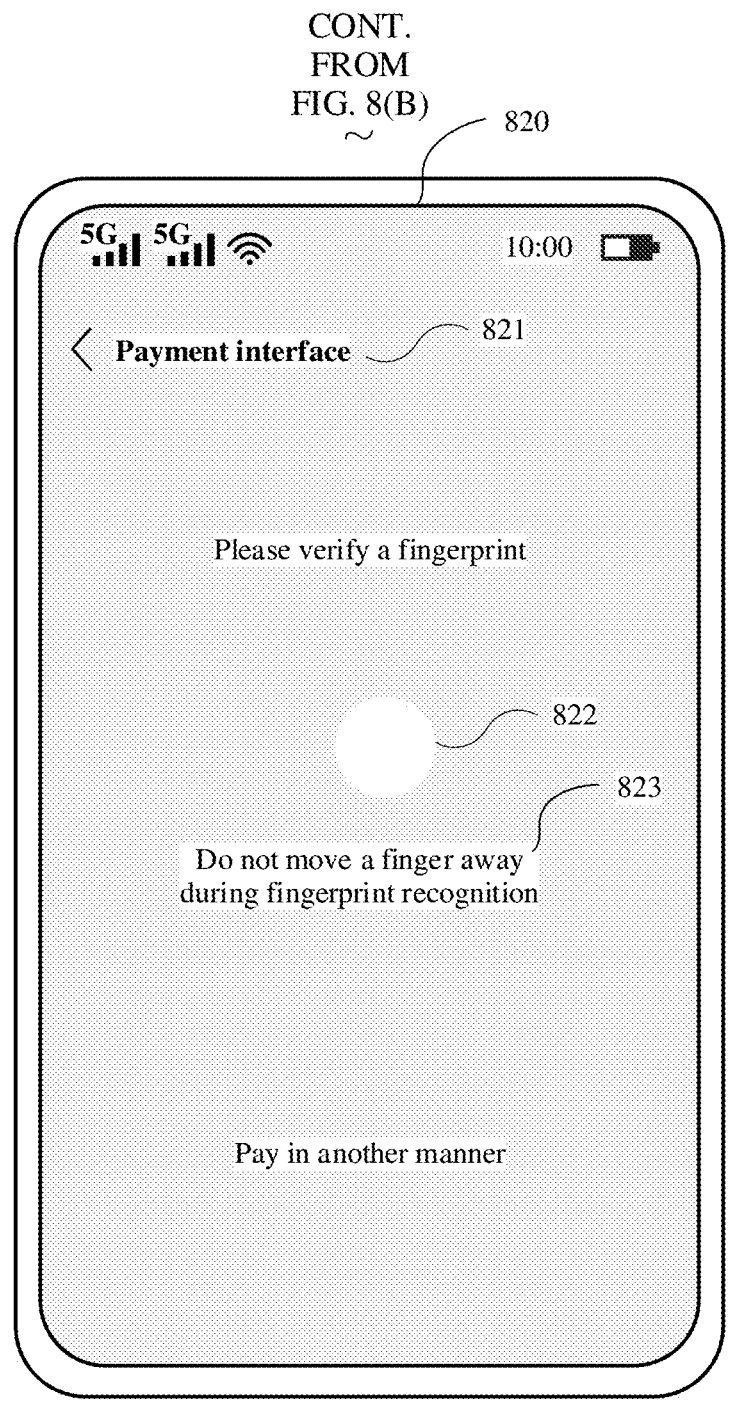

FIG. 8(A), FIG. 8(B), and FIG. 8(C) are examples of schematic diagrams of user interfaces for fingerprint payment. In FIG. 8(A), FIG. 8(B), and FIG. 8(C), descriptions are provided by using a user interface of a payment application as an example.

As shown in FIG. 8(A), an electronic device may display a user interface 810. The user interface 810 may include an interface theme 811 (that is, "payment details"), a payment amount 812, a payment manner 813, and a payment control 814. The payment amount 812 is used to display an amount that a user needs to pay (that is, "256.5", and a unit is yuan). The payment manner 813 may be used to display a payment manner (that is, "a balance") used by the user. The payment manner 813 may be further used by the user to switch a payment manner. The payment control 814 may be used by the user to confirm performing of a payment operation. The electronic device may receive a user operation (for example, a touch operation) performed on the payment control 814. In response to the user operation, the electronic device may identify a user identity to complete the payment operation. Details are shown in FIG. 8(B). The user operation performed on the payment control 814 may be understood as being used to trigger fingerprint recognition.

As shown in FIG. 8(B), the electronic device may display a user interface 820. The user interface 820 may include an interface theme 821 (that is, "a payment interface"), a fingerprint recognition area 822, some prompt information, and the like. A fingerprint icon may be displayed in the fingerprint recognition area 822. Brightness of the fingerprint recognition area 822 is the same as brightness of a mask area in the user interface 820 except the fingerprint recognition area 822. The electronic device may receive a user operation (for example, a touch operation) performed on the fingerprint recognition area 822. In response to the user operation, the electronic device may control the brightness of the fingerprint recognition area 822, that is, control a fingerprint recognition area in the display screen to be highlighted. A specific example is shown in FIG. 8(C).

As shown in FIG. 8(C), the brightness of the fingerprint recognition area 822 is greater than or equal to a preset brightness value, and is greater than the brightness of the mask area in the user interface 820 except the fingerprint recognition area 822. In this case, the electronic device may collect, by using light provided by the fingerprint recognition area 822, optical fingerprint information of a finger acting on the fingerprint recognition area 822. In this case, the user interface 820 may display fingerprint unlocking prompt information 823. For example, "Do not move a finger away during fingerprint recognition". A user may obtain, by using the prompt information 823, that the electronic device is currently recognizing a fingerprint of the user. The electronic device may identify a user identity based on the optical fingerprint information. When determining that the current user is an authorized user, the electronic device may display payment success prompt information. When determining that the current user is an unauthorized user, the electronic device may keep displaying a payment interface. The prompt information 823 may be used to indicate a recognition result. For example, "Fingerprint recognition fails. Please try again." The example in which the electronic device identifies the user identity based on the optical fingerprint information is similar to that in FIG. 7(C).

In some other embodiments, a user interface 820 shown in FIG. 8(C) may alternatively not include the prompt information 823.

In some other embodiments, after displaying the user interface 810 shown in FIG. 8(A), the electronic device may alternatively and directly display the user interface 820 shown in FIG. 8(C), instead of displaying the user interface 820 shown FIG. 8(B). In some other embodiments, the electronic device may alternatively display the fingerprint recognition area in the user interface 810 shown in FIG. 8(A).

This application is not limited to the foregoing examples. During specific implementation, optical fingerprint recognition may be further applied to another scenario, such as an identity authentication scenario or a fingerprint photographing scenario. A specific application scenario of optical fingerprint recognition is not limited in this application.

Based on the embodiments shown in FIG. 1 to FIG. 8(A), FIG. 8(B), and FIG. 8(C), the following describes a display method provided in an embodiment of this application.

Figure 9:
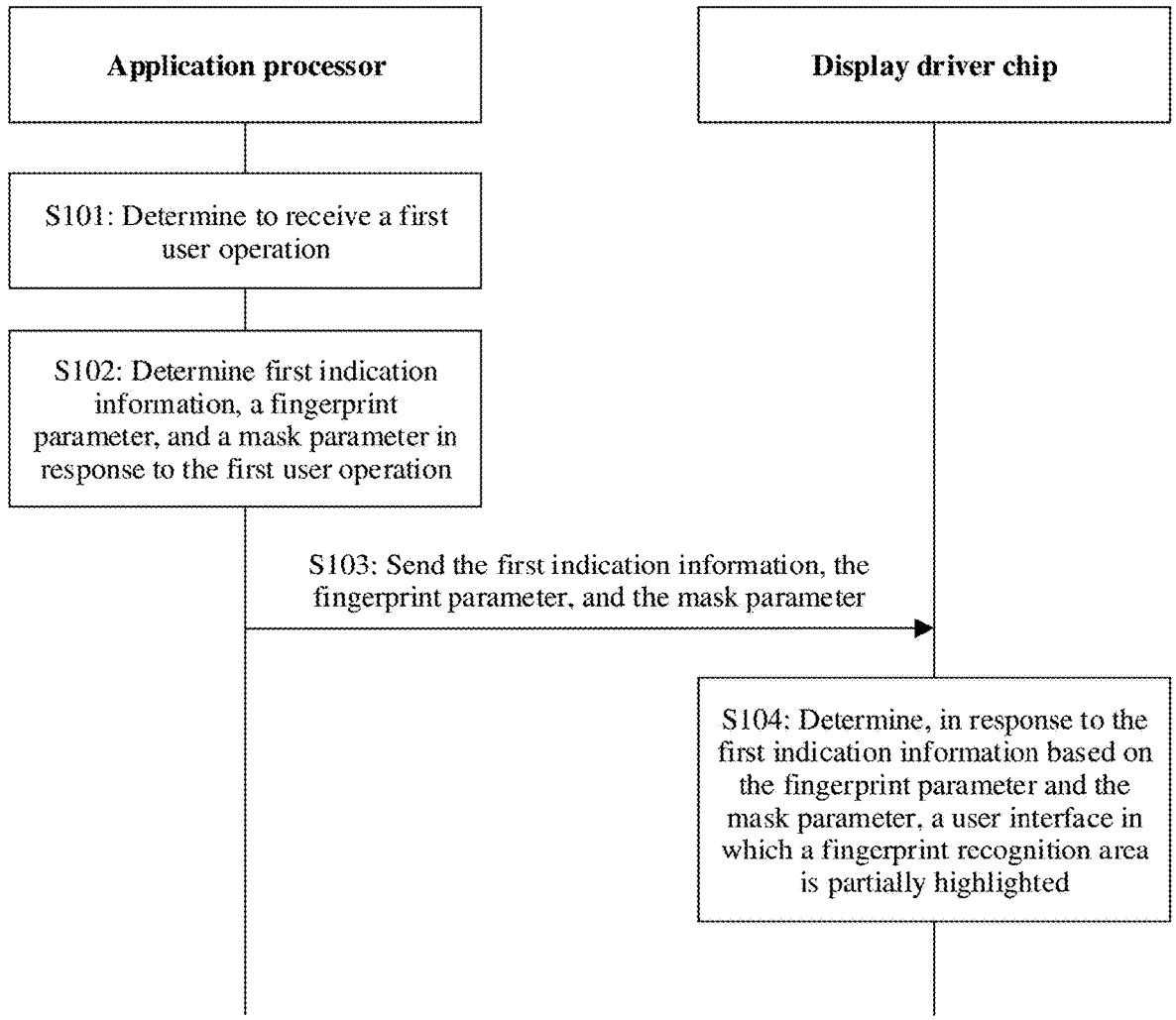
FIG. 9 is a schematic flowchart of a display method according to an embodiment of this application.

FIG. 9 is a schematic flowchart of a display method according to an embodiment of this application. The method may be applied to the electronic device 100 shown in FIG. 5. The method may be applied to the electronic device 100 shown in FIG. 6. The method may be applied to the electronic device 100 shown in FIG. 7(A), FIG. 7(B), and FIG. 7(C). The method may include, but is not limited to, the following steps.

S101: An application processor (AP) determines to receive a first user operation.

Specifically, the first user operation is, for example, but is not limited to, a touch operation performed on a display screen, a touch operation performed on a fingerprint recognition area in the display screen, a lifting operation, a voice (such as "unlocking" or "payment"), a gesture (such as making a first or splaying a finger), and the like. In some embodiments, when receiving the first user operation, the AP may determine to trigger optical fingerprint recognition, and the AP may control the display screen to display a user interface used during fingerprint recognition.

In some embodiments, before S101, the method further includes: displaying, by a display panel of the display screen, a first image. The first image is an image used before fingerprint recognition, such as the user interface 700 shown in FIG. 7(A) or FIG. 7(B), or the user interface 820 shown in FIG. 8(B) or FIG. 8(C). When the display panel displays the first image, brightness of the fingerprint recognition area is equal to brightness of a mask area.

S102: The AP determines first indication information, a fingerprint parameter, and a mask parameter in response to the first user operation.

S103: The AP sends the first indication information, the fingerprint parameter, and the mask parameter to a display driver chip (DDIC).

Specifically, the first indication information is used to indicate the DDIC to determine and display a second image, that is, an image used during fingerprint recognition. In some embodiments, the first indication information is specifically used to indicate the DDIC to control the brightness of the fingerprint recognition area and the brightness of the mask area in the display panel.

In some embodiments, the fingerprint parameter may be used to control the brightness of the fingerprint recognition area. In some embodiments, the fingerprint parameter may be a brightness code (code) of the fingerprint recognition area. Optionally, the brightness code may be used to indicate a brightness value (a unit may be a nit) of the fingerprint recognition area. For example, a brightness code 1111 is used to indicate a brightness value of 850 nits. This application is not limited thereto. The brightness code may be further used to indicate a parameter of the fingerprint recognition area, such as a quantity, a size, a location, a shape, or a color. Specific content indicated by the brightness code is not limited in this application.

Figure 10:
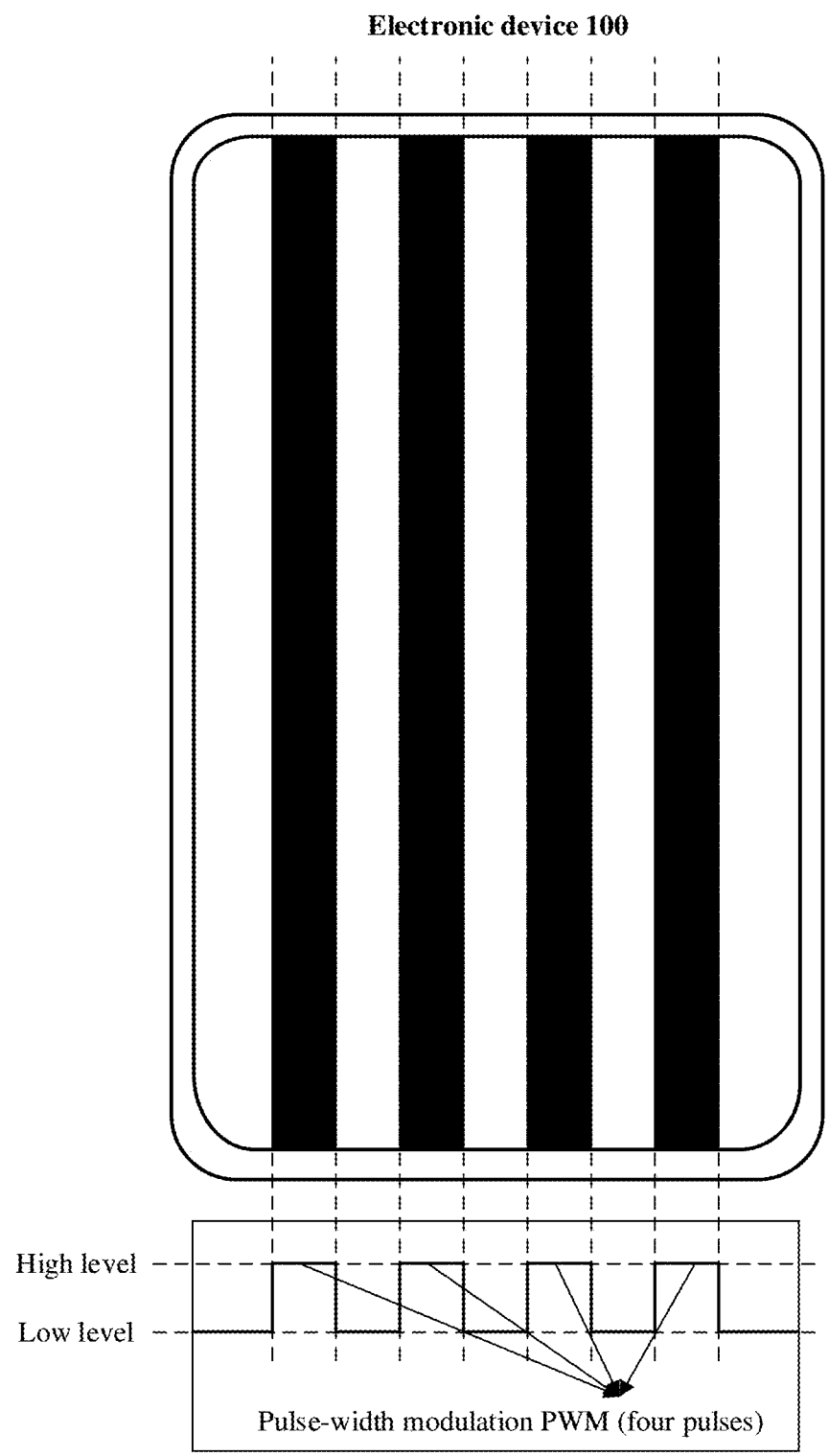
FIG. 10 is a schematic diagram of a light adjustment mode of a display screen according to an embodiment of this application.

In some embodiments, the mask parameter may be used to control the brightness of the mask area, for example, is used to perform grayscale reduction processing (for example, decreasing brightness or darkening a color) on an image in the mask area. In some embodiments, the mask parameter may include information used to indicate a light adjustment mode. In some other embodiments, the mask parameter may be sent to the DDIC together with the information used to indicate the light adjustment mode. The light adjustment mode of the display screen may include direct current adjustment (direct current, DC) and pulse-width modulation (pulse-width modulation, PWM). In the DC mode, brightness of the display screen is adjusted by changing a current. This application is not limited thereto. Alternatively, brightness may be adjusted by changing a voltage. Alternatively, brightness may be adjusted by changing a current and a voltage. However, in the PWM mode, the current and/or the voltage is not changed. In the PWM mode, brightness of the display screen is adjusted by adjusting a duty cycle. This application is not limited thereto. Alternatively, brightness of the display screen may be adjusted by adjusting a quantity of pulses (pulse). Alternatively, brightness of the display screen may be adjusted by using a quantity of pulses and a duty cycle. For an example of the PWM mode, refer to FIG. 10. In FIG. 10, descriptions are provided by using an example in which the quantity of pulses is 4.

As shown in FIG. 10, one frame of image may include four black strips that are black-shielded. It may be understood that parts in which the black strips are located is in a screen-off state. The four black strips respectively correspond to four pulses at a high level. Therefore, it may be understood that a high level represents a screen-off state, and a low level represents a screen-on state. During PWM adjustment, the display screen does not continuously emit light, but continuously keeps turning on and off the display screen. In other words, the brightness of the display screen is adjusted by alternately turning on and off the display screen. A wider width of each black strip indicates longer duration of the high level (that is, a longer screen-off time), and lower brightness that is a sense of the display screen for a naked eye. A narrower width of each black strip indicates shorter duration of the high level (that is, a longer screen-on time), and higher brightness that is a sense of the display screen for the naked eye. It may be understood that the high level and the low level periodically occur, and a location of the black strip also changes with time. It may be alternatively understood that the black strip continuously moves on each frame of image. The duty cycle is actually adjusted through the PWM by adjusting a width of the black strip (by adjusting duration of the high level).

During PWM adjustment, the brightness of the display screen is actually adjusted by alternately turning on and off the display screen. Therefore, when the light adjustment mode is the PWM mode, it cannot be ensured that the brightness value of the fingerprint recognition area remains unchanged and is greater than or equal to a preset brightness value during fingerprint recognition. Therefore, if the light adjustment mode that is of the display screen and that is used before fingerprint recognition is the PWM mode, the AP may send, to the DDIC, information indicating that the light adjustment mode is the DC mode. Before fingerprint recognition, the light adjustment mode of the display screen may be the DC mode or may be the PWM mode. For example, before fingerprint recognition, when the brightness of the display screen is less than or equal to a brightness threshold (for example, 90 nits), the light adjustment mode is the PWM mode; or when the brightness of the display screen is greater than the brightness threshold (for example, 90 nits), the light adjustment mode is the DC mode. In some embodiments, the information indicating that the light adjustment mode is the DC mode may be sent together with an address of a module that is on the DDIC and that is configured to control the light adjustment mode. For example, when the information indicating that the light adjustment mode is the DC mode is written into the module that is configured to control the light adjustment mode and that corresponds to the address, a bit of the module may be set to 1, that is, the light adjustment mode is set to the DC mode. If the bit of the register is set to 0, the light adjustment mode is set to the PWM mode. The module that is on the DDIC and that is configured to control the light adjustment mode may be integrated into the mask module 2212C shown in FIG. 4, or may be independent of the mask module 2212C.

In some other embodiments, the information used to indicate the light adjustment mode may alternatively be in the first indication information, and the DDIC may set the light adjustment mode in response to the first indication information. A specific form of sending the information used to indicate the light adjustment mode is not limited in this application.

In some embodiments, the mask parameter may include an alpha value used to reduce a grayscale. A range of the alpha value is [0, 1]. A smaller alpha value indicates stronger grayscale reduction effect, such as lower brightness or a darker color.

In some embodiments, the alpha value may be determined by the AP based on an image (which may be referred to as a reference mask) that is of the mask area and that is used before fingerprint recognition. For example, the AP may determine the alpha value based on an expression used to reduce the grayscale. The expression is specifically: Grayscale of an image (which may be referred to as a display mask) that is of the mask area and that is used during fingerprint recognition=Grayscale of the reference mask× Brightening proportion×Alpha. To ensure that the display mask is the same as the reference mask (for example, display parameters are the same, such as brightness and colors), the following condition needs to be met: Brightening proportion×Alpha=1. Assuming that the light adjustment mode used before fingerprint recognition is the PWM mode, the reference mask is displayed in the PWM mode. In this case, the AP may first determine an image that is displayed in the DC mode and that is of the reference mask, and the image may be referred to as a brightened image. Brightness of the brightened image may be greater than brightness of the reference mask. Then, the AP may calculate the brightening proportion as follows: Brightening proportion=(Grayscale of the brightened image/Grayscale of the reference mask), where the brightening proportion is greater than 1. Finally, the AP may calculate alpha as follows: Alpha=(1/Brightening proportion), where alpha is less than 1. Assuming that the light adjustment mode used before fingerprint recognition is the DC mode, the brightened image is the same as the reference mask. Therefore, the brightening proportion is equal to 1, and alpha is also equal to 1. In some other embodiments, the alpha value may be preset by the AP. For example, when the light adjustment mode used before the fingerprint recognition area is highlighted is the DC mode, the alpha value is preset to 1.

Optionally, when the display screen displays the image used before fingerprint recognition, if the light adjustment mode is the PWM, the brightness of the brightened image is greater than that of the image of the reference mask, and alpha is less than 1. Optionally, when the display screen displays the image used before fingerprint recognition, if the light adjustment mode is DC, the brightness of the brightened image is equal to that of the reference mask, and alpha is equal to 1.

This application is not limited to the examples listed above. In some other embodiments, a manner of calculating the brightening proportion may also be as follows: Brightening proportion=(Grayscale of a full-screen brightened image/Grayscale of the image used before fingerprint recognition). The full-screen brightened image is an image that is displayed in the DC mode and that is for the image used before fingerprint recognition. It may also be understood that the AP may directly determine the alpha value based on the image displayed in a full screen, instead of first determining the image of the mask area based on the image displayed in the full screen and then determining the alpha value based on the image of the mask area.

S104: The DDIC determines, in response to the first indication information based on the fingerprint parameter and the mask parameter, an image in which the fingerprint recognition area is partially highlighted.

Specifically, the DDIC may determine and control, in response to the first indication information, the display panel to display the second image, that is, the image used during fingerprint recognition. In some embodiments, the DDIC may update, in response to the first indication information, the first image displayed by the display panel. Specifically, the DDIC controls the brightness of the fingerprint recognition area in the first image to be first brightness, and controls the brightness of the mask area in the first image to be second brightness. An updated first image is the second image, that is, the image used during fingerprint recognition. In some embodiments, when the display panel displays the first image (that is, the image used before fingerprint recognition), the brightness of the fingerprint recognition area is the same as the brightness of the mask area, that is, the second brightness. In some embodiments, when the display panel displays the second image (that is, the image used during fingerprint recognition), the brightness of the fingerprint recognition area is greater than or equal to the preset brightness value, and is greater than the brightness of the mask area. Display effect of the mask area is consistent with display effect of the mask area in the image used before fingerprint recognition. In other words, display effect of the display mask is consistent with display effect of the reference mask (for example, display parameters are the same, such as brightness and hues). Therefore, it may be referred to as that the fingerprint recognition area is partially highlighted in the image used during fingerprint recognition. In some embodiments, the DDIC may control the brightness of the fingerprint recognition area in the display panel in response to the first indication information based on the fingerprint parameter, and control the brightness of the mask area based on the mask parameter, to ensure that a case such as screen flickering does not occur.

In some embodiments, the DDIC may control the brightness of the fingerprint recognition area in the display panel in response to the first indication information based on the fingerprint parameter sent by the AP. This application is not limited thereto. The DDIC may further control display effect of the fingerprint recognition area, such as a quantity, a size, a location, a shape, or a color. In some embodiments, the DDIC may determine, based on the fingerprint parameter, a drive voltage and/or a current of the fingerprint recognition area as a first voltage and/or a first current. Optionally, the DDIC may set a DBV of a pixel in the fingerprint recognition area to a first threshold and set a grayscale to a second threshold based on the fingerprint parameter. When the DBV is the first threshold and the grayscale is the second threshold, the corresponding drive voltage and/or the corresponding current is the first voltage and/or the first current. Optionally, a DBV corresponding to a brightness value of a pixel used when the fingerprint recognition area is highlighted is usually a maximum value. For example, a value of the DBV is 0 to 4095, and the first threshold is 4095. Optionally, generally, when the fingerprint recognition area is highlighted, a grayscale of the pixel is set to a maximum value. For example, a value of the grayscale is 0 to 255, and the second threshold is 255. Optionally, generally, when grayscales of pixels in the fingerprint recognition area are all set to the maximum value, a color of an image in the fingerprint recognition area is white.

In some embodiments, the DDIC may determine, in response to the first indication information based on the mask parameter sent by the AP, the image (that is, the display mask) that is of the mask area and that is used during fingerprint recognition. In some embodiments, the DDIC may receive the information that is sent by the AP and that is used to indicate that the light adjustment mode is the DC mode, and set the light adjustment mode to the DC mode. In some embodiments, the DDIC may perform, based on the mask parameter, grayscale reduction processing on the image (that is, a reference mask used when the light adjustment mode is the DC mode, that is, the brightened image) that is of the mask area, that is used before fingerprint recognition, and that is used when the light adjustment mode is the DC mode, to obtain the display mask. In some embodiments, the mask parameter may include an alpha value used to reduce a grayscale. The DDIC may obtain the display mask based on the brightened image and the alpha value, that is, grayscale of the display mask=(grayscale of the brightened image×alpha).

This application is not limited to the cases illustrated in FIG. 9. In some other embodiments, alternatively, the AP may not send the fingerprint parameter to the DDIC, and the DDIC may control partial highlighting of the fingerprint recognition area in response to the first indication information based on a preconfigured fingerprint parameter. For example, the DDIC may preset a brightness value of the fingerprint recognition area. The DDIC may control the brightness of the fingerprint recognition area in response to the first indication information based on the preset brightness value. This application is not limited thereto. A parameter such as a quantity, a size, a location, a shape, or a color may be further preconfigured. The DDIC may control display of the fingerprint recognition area based on the preconfigured parameter.

This application is not limited to the cases illustrated in FIG. 9. In some other embodiments, the AP may alternatively not send the mask parameter to the DDIC. The DDIC may reduce the grayscale of the mask area in response to the first indication information based on a preconfigured mask parameter, to obtain the display mask. For example, if the display screen displays the image used before fingerprint recognition, the light adjustment mode is the DC, and the alpha value is preconfigured as 1. In some other embodiments, the DDIC may calculate the alpha value by itself. For an example of a calculation manner, refer to the descriptions of calculating the alpha value by the AP in S101 and S102. The DDIC may determine the display mask in response to the first indication information based on the self-calculated alpha value.

It may be understood that the DDIC may perform some processing (for example, gamma processing) on a to-be-displayed image, and then control the display panel to perform display. Therefore, when the DDIC calculates the alpha value by itself, the determined brightened image is more in line with actual display effect on the display panel, and display effect of a display mask obtained after a grayscale is reduced is more consistent with display effect of the reference mask, thereby improving display effect of the mask area.

In the method shown in FIG. 9, the AP sends the first indication information to the DDIC, to control the DDIC to determine and display the image used during fingerprint recognition. The DDIC may control both the brightness of the fingerprint recognition area and the brightness of the mask area, and the AP does not need to perform drawing and composing to obtain the image used during fingerprint recognition (for example, perform the process shown in FIG. 6). Display effect does not depend on an AP platform and a manufacturer. This also simplifies a processing procedure on an AP side, and increases a recognition speed. In addition, SPR processing on the AP side is also not performed on the image used during fingerprint recognition, and both relatively low power consumption and relatively good display effect of the mask area are ensured. Color processing on the AP side is also not performed on the image used during fingerprint recognition. In this case, not only it can be ensured that a display mode such as an eye protection mode or a bright mode is enabled during fingerprint recognition, thereby avoiding a public opinion from a user, but also relatively good display effect of the mask area can be ensured.

In addition, the fingerprint parameter and/or the mask parameter for partially highlighting the fingerprint recognition area may be the parameter preconfigured by the DDIC, or may be a parameter configured by the AP in real time based on different display screens in different scenarios. Therefore, adaptability is stronger, and an application scenario is more extensive.

In a possible implementation, the DDIC may individually control a manner of displaying the fingerprint recognition area, for example, control a size, a shape, a quantity, a location, a color, or brightness of the fingerprint recognition area, without affecting display effect of the mask area other than the fingerprint recognition area. For example, the DDIC may individually control the brightness of the fingerprint recognition area, without affecting the brightness of the mask area other than the fingerprint recognition area (that is, the brightness of the mask area remains unchanged). In some embodiments, the AP may send the first indication information and the fingerprint parameter to the DDIC. The DDIC may individually control display of the fingerprint recognition area in response to the first indication information based on the fingerprint parameter sent by the AP. In some other embodiments, the AP may send the first indication information to the DDIC, and the DDIC may individually control display of the fingerprint recognition area in response to the first indication information based on the preconfigured fingerprint parameter.

In some embodiments, there may be a plurality of fingerprint recognition areas, and locations of the plurality of fingerprint recognition areas may be different. Manners of displaying the plurality of fingerprint recognition areas may be the same or may be different. For example, some of the fingerprint recognition areas are highlighted, and some of the fingerprint recognition areas are not highlighted. For a specific example, refer to FIG. 11, FIG. 12(A), and FIG. 12(B).

In some embodiments, an unfoldable display screen may be configured on the electronic device. The one display screen may include at least one DDIC. The one display screen may have a plurality of fingerprint recognition areas. The plurality of fingerprint recognition areas may be controlled by one or more DDICs. The one or more DDICs may be all or some of the at least one DDIC included in the display screen. A specific example is shown in FIG. 11.

Figure 11:
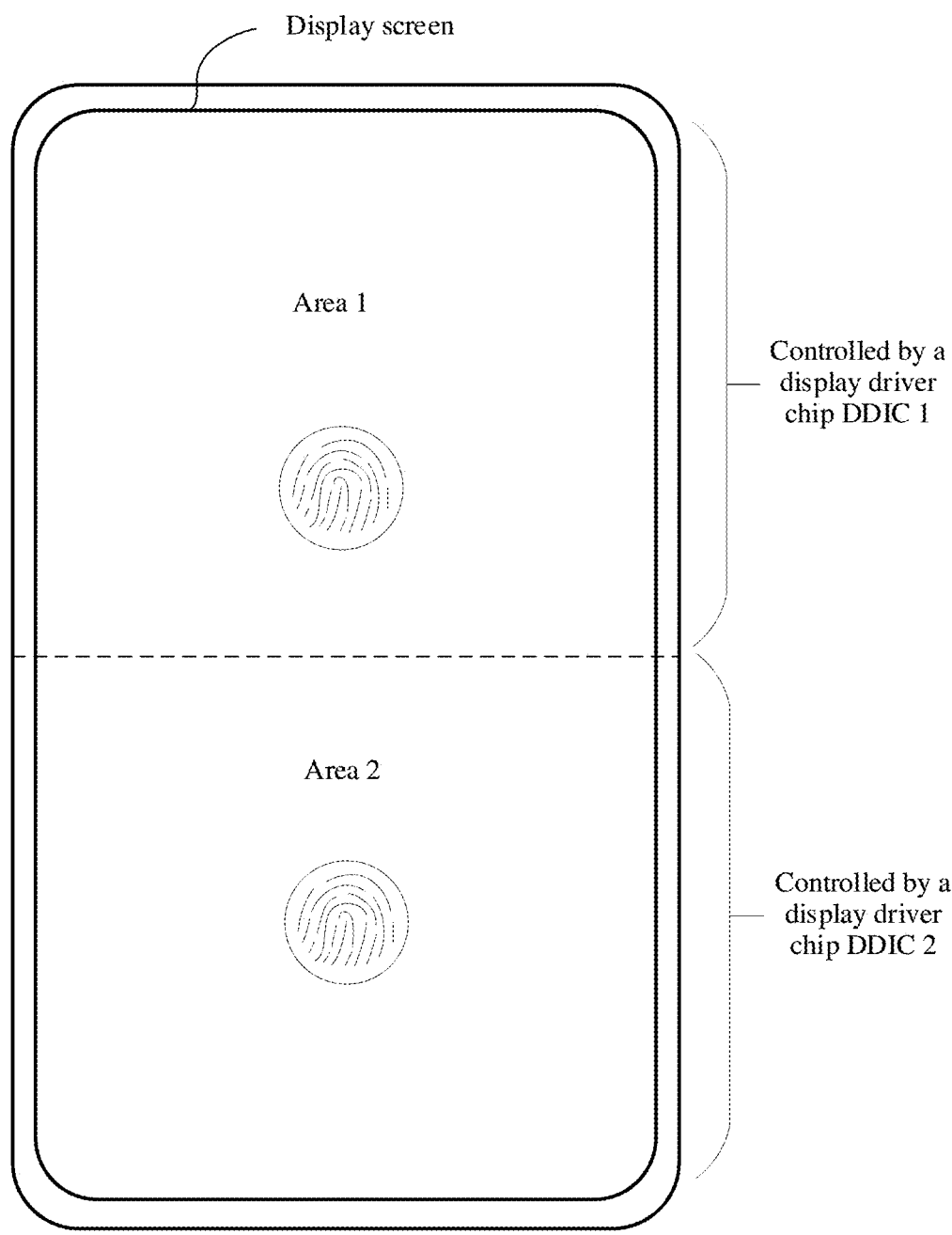
FIG. 11, FIG. 12(A), and FIG. 12(B) are schematic diagrams of forms of some electronic devices according to embodiments of this application.

FIG. 11 is an example of a schematic diagram of a form of an electronic device.

As shown in FIG. 11, the electronic device may include one display screen. A display panel of the one display screen may be divided into an upper area and a lower area: an area 1 and an area 2. There may be one fingerprint recognition area in each of the area 1 and the area 2. The fingerprint recognition area in the area 1 may be controlled and displayed by a DDIC 1 of the display screen, and the fingerprint recognition area in the area 2 may be controlled by a DDIC 2 of the display screen. In some embodiments, the DDIC 1 and the DDIC 2 may be connected in series. Optionally, for the DDIC 1 and the DDIC 2, there may be a primary DDIC and a secondary DDIC. The primary DDIC may be configured to control the secondary DDIC to work, so that the area 1 and the area 2 jointly display a frame of image.

This application is not limited to the example illustrated in FIG. 11. During specific implementation, the fingerprint recognition area in the area 1 and the fingerprint recognition area in the area 2 may alternatively be controlled by one DDIC. Alternatively, the area 1 and the area 2 may be a left area and a right area. Alternatively, one area may include a plurality of fingerprint recognition areas. A specific manner of displaying a fingerprint recognition area and a DDIC that controls display are not limited in this application.

In some other embodiments, a foldable display screen (which may be referred to as a foldable screen) may be configured on the electronic device. The foldable screen may include at least one DDIC. The foldable screen may have a plurality of fingerprint recognition areas. The plurality of fingerprint recognition areas may be controlled by one or more DDICs. The one or more DDICs may be all or some of the at least one DDIC included in the foldable screen. A specific example is shown in FIG. 12(A) and FIG. 12(B).

Figure 12A:
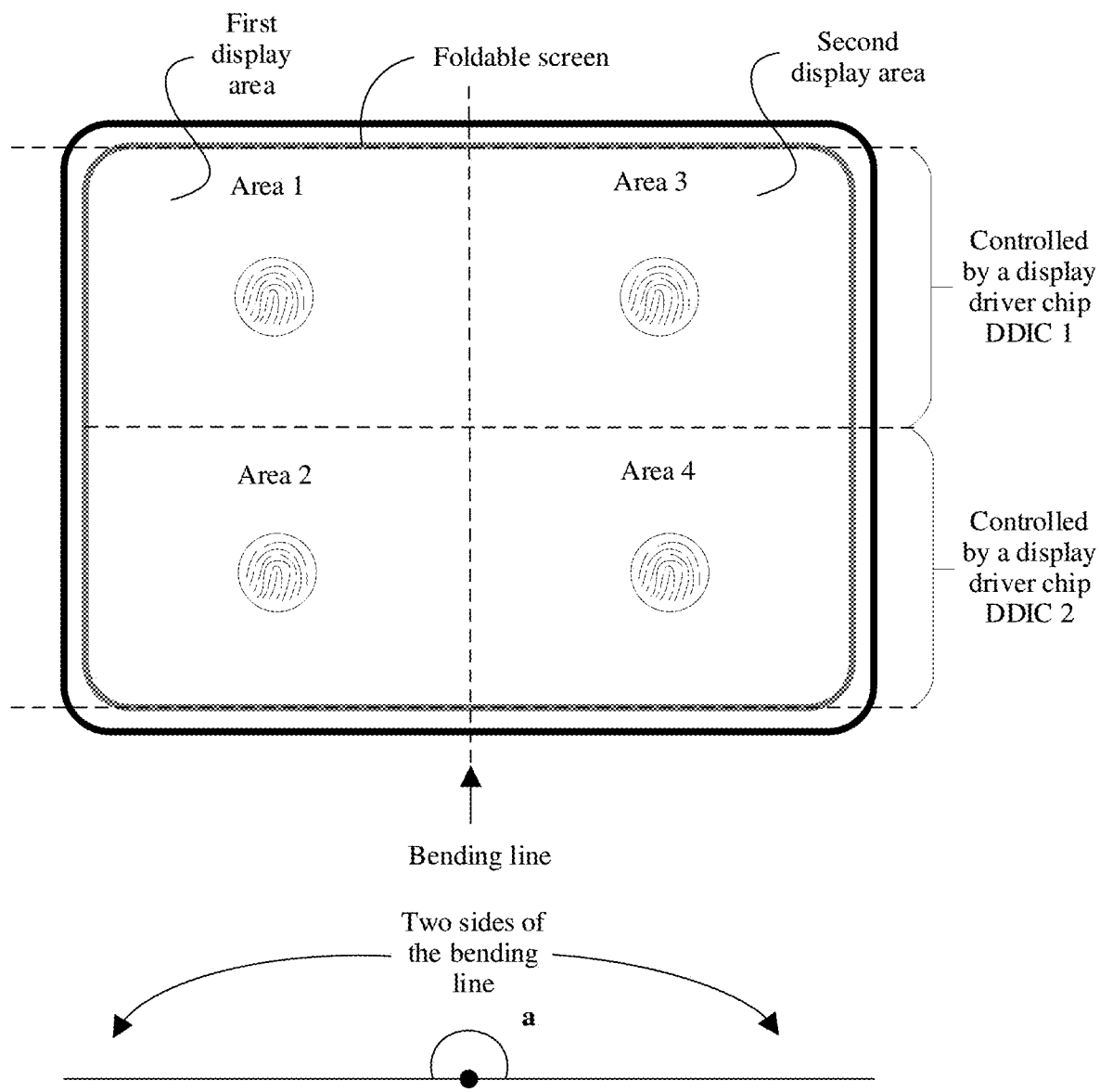
Figure 12B:
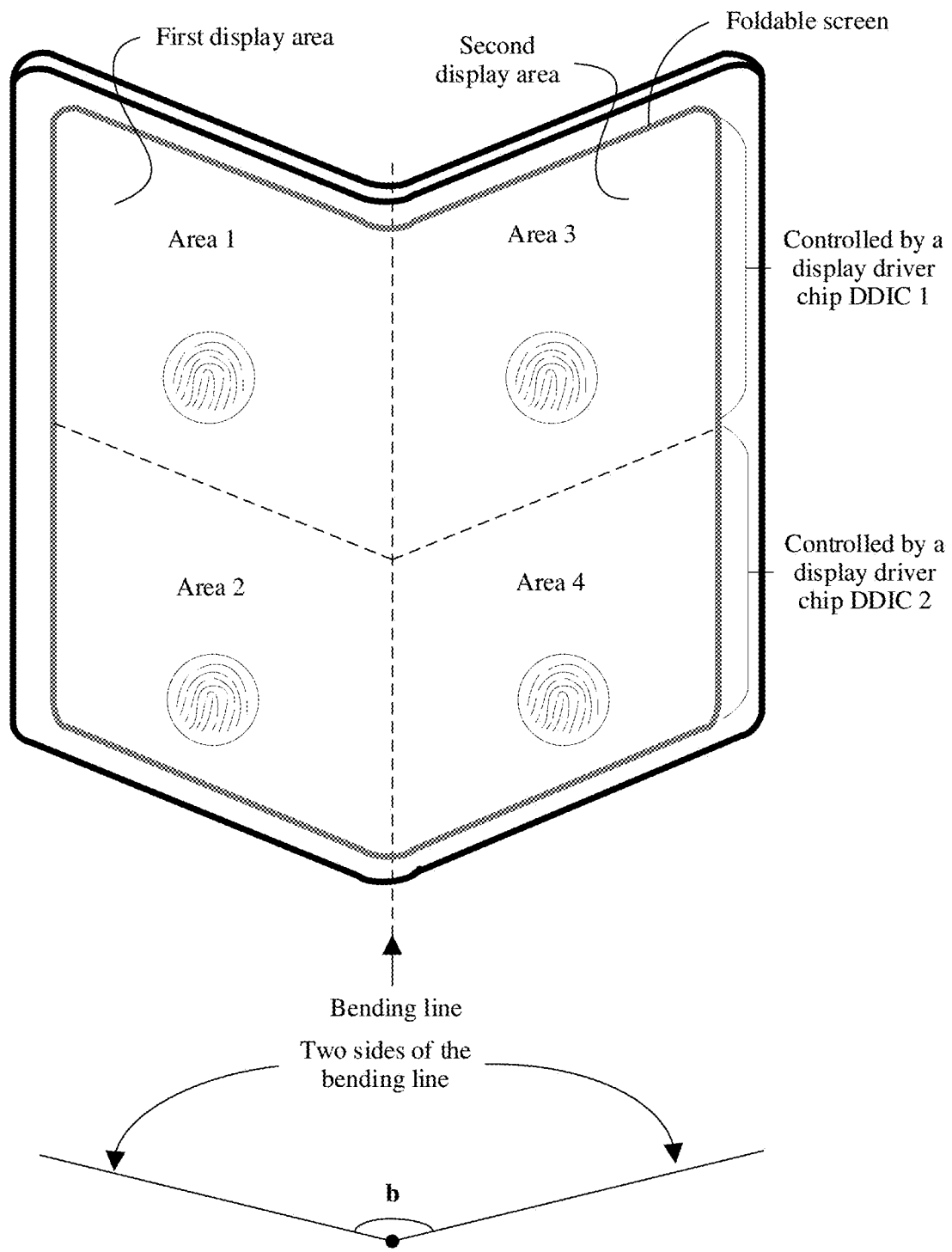

FIG. 12(A) and FIG. 12(B) are examples of schematic diagrams of other forms of an electronic device. FIG. 12(A) is a schematic diagram in an angle of view of the electronic device, and FIG. 12(B) is a schematic diagram in another angle of view of the electronic device.

As shown in FIG. 12(A) and FIG. 12(B), the electronic device may include a flexible foldable screen, the foldable screen may include a first display area and a second display area on two sides of a bending line, and the foldable screen may be bent along the bending line. The foldable screen may be in an expanded state or a bent state (including a folded state). Alternatively, it may be understood that the electronic device on which the foldable screen is configured may be in an expanded state or a bent state.

As shown in FIG. 12(A), when the foldable screen is in the expanded state, a bending angle a of the foldable screen is approximately 180 degrees. The bending angle of the foldable screen may also be understood as an angle between a plane on which the first display area is located and a plane on which the second display area is located. This application is not limited thereto. The bending angle a may also be greater than or equal to 170 degrees and less than or equal to 180 degrees. A specific value of the bending angle of the foldable screen in the expanded state is not limited in this application.

As shown in FIG. 12(B), when the foldable screen is in the bent state, a bending angle b of the foldable screen is approximately 120 degrees. This application is not limited thereto. The bending angle b may be greater than or equal to 0 degrees, and is less than 180 degrees, for example, but not limited to, 0 degrees (in this case, the bent state may also be referred to as the folded state, and a light-out surface of the first display area is opposite to that of the second display area), 60 degrees, 90 degrees, and the like. A specific value of the bending angle of the foldable screen in the bending state is not limited in this application.

As shown in FIG. 12(A) and FIG. 12(B), the first display area may be divided into an upper area and a lower area: an area 1 and an area 2, and the second display area may be divided into an upper area and a lower area: an area 3 and an area 4. There may be one fingerprint recognition area in each of the four areas. The fingerprint recognition area in the area 1 and the fingerprint recognition area in the area 3 may be controlled by a DDIC 1 of the foldable screen, and the fingerprint recognition area in the area 2 and the fingerprint recognition area in the area 4 may be controlled by a DDIC 2 of the foldable screen. In some embodiments, the DDIC 1 and the DDIC 2 may be connected in series. Optionally, for the DDIC 1 and the DDIC 2, there may be a primary DDIC and a secondary DDIC. The primary DDIC may be configured to control the secondary DDIC to work, so that the first display area and the second display area jointly display a frame of image.

This application is not limited to the cases illustrated in FIG. 12(A) and FIG. 12(B). During specific implementation, the fingerprint recognition area in the area 1 and the fingerprint recognition area in the area 2 may be controlled by the DDIC 1 of the foldable screen, and the fingerprint recognition area in the area 3 and the fingerprint recognition area in the area 4 may be controlled by the DDIC 2 of the foldable screen. Alternatively, the four areas on the foldable screen are controlled by one DDIC. Alternatively, there may be more or fewer fingerprint recognition areas in the first display area and the second display area. A specific manner of displaying a fingerprint recognition area and a DDIC that controls display are not limited in this application.

This application is not limited to the cases illustrated in FIG. 12(A) and FIG. 12(B). During specific implementation, the foldable screen of the electronic device may also be a display screen formed by splicing a rigid screen, a flexible screen, and a connection component, for example, a chain. For example, the foldable screen may be formed by splicing two rigid screens and a chain configured to connect the two rigid screens. The first display area and the second display area are respectively areas on the two rigid screens, and are both used to display a user interface. The first display area may include at least one DDIC, and the fingerprint recognition area in the area 1 and the fingerprint recognition area in the area 2 that are in the first display area may be respectively controlled by different DDICs. The second display area may include at least one DDIC, and the area 3 and the area 4 that are in the second display area may be respectively controlled by different DDICs. In some embodiments, the DDIC configured to control the area 1 in the first display area and the DDIC configured to control the area 3 in the second display area may be connected in series. Optionally, for the two DDICs, there may be a primary DDIC and a secondary DDIC. The primary DDIC may be configured to control the secondary DDIC to work, so that the area 1 and the area 3 jointly display a frame of image. The structure of the display screen of the electronic device, the specific manner of displaying a fingerprint recognition area, and the DDIC that controls display are not limited in this application.

This application is not limited to the cases illustrated in FIG. 11, FIG. 12(A), and FIG. 12(B). During specific implementation, a display screen may be configured on both sides of the electronic device. The display screen on the two sides may be two display screens, or may be a flexible foldable screen. If the display screen on the two sides is two display screens, each of the display screens may be the display screen shown in FIG. 11, or may be the display screens shown in FIG. 12(A) and FIG. 12(B). Regardless of the structure, for each display screen, a fingerprint recognition area and a DDIC that controls the fingerprint recognition area are also similar to those in FIG. 11, FIG. 12(A), and FIG. 12(B). A specific form of the electronic device (which may also be understood as a specific form of the display screen) is not limited in this application.

A manner of controlling each fingerprint recognition area is similar to the manner of controlling the fingerprint recognition area shown in FIG. 1 to FIG. 10, and details are not described again.

It may be understood that a manner of displaying the fingerprint recognition area such as a quantity or a location may be flexibly configured based on an actual requirement, and an application scenario is more extensive.

In a possible implementation, the DDIC may independently implement a grayscale reduction function, to adjust brightness of a displayed image. For example, when an anti-flicker function is enabled, the DDIC may receive an image drawn by an AP and reduce a grayscale of the image, to display, on the display panel, an image whose grayscale is reduced. An implementation of reducing the grayscale is similar to the implementation of reducing the grayscale of the mask area in FIG. 1 to FIG. 10. However, grayscale reduction is not limited to the mask area, but may be performed on all areas or any other areas in the display screen. Similar to highlighting of the fingerprint recognition area, during PWM adjustment, brightness of the display screen is actually adjusted by alternately turning on and off the display screen. Therefore, when a light adjustment mode is a PWM mode, it cannot be ensured that the brightness of a displayed image remains unchanged and is a relatively low brightness value. Therefore, the anti-flicker function cannot be implemented. If a light adjustment mode used before the grayscale is reduced is the PWM mode, the AP may send, to the DDIC, information indicating that the light adjustment mode is a DC mode, to implement the anti-flicker function.

This application is not limited thereto. The AP in this application may be replaced with another processing chip or processing unit, for example, a SoC. In some embodiments, the AP may be integrated into the another processing chip or processing unit, for example, the SoC. In some other embodiments, the AP is independent of the another processing chip or processing unit, for example, the SoC.

This application is not limited thereto. The DDIC in this application may also be replaced with a driver chip or a processing unit inside another display screen. In some embodiments, the DDIC may be integrated in the driver chip or the processing unit inside the another display screen. In some other embodiments, the DDIC may be independent of the driver chip or the processing unit inside the another display screen.

"Drawing" and "composing" in this application may also be replaced with "generating", "obtaining", and "determining". The descriptions in this application are merely examples, and should not constitute a limitation.

One or more of the foregoing modules or units may be implemented by software, hardware, or a combination thereof.

When any one of the foregoing modules or units is implemented by software, the software exists in a form of computer program instructions, and is stored in a memory. A processor may be configured to execute the program instructions to implement the foregoing method procedures. The processor may include, but is not limited to, at least one of the following: a central processing unit (central processing unit, CPU), a microprocessor, a digital signal processor (DSP), a microcontroller unit (microcontroller unit, MCU), and various types of computing devices for running software, for example, an artificial intelligence processor. Each type of computing device may include one or more cores used to execute software instructions to perform an operation or processing. The processor may be an independent semiconductor chip, or may be integrated with another circuit into a semiconductor chip. For example, the processor may form a SoC (system-on-a-chip) with another circuit (such as a codec circuit, a hardware acceleration circuit, or various bus and interface circuits). Alternatively, the processor may be integrated into an ASIC as a built-in processor of the ASIC, and the ASIC integrated with the processor may be separately packaged, or may be packaged together with another circuit. In addition to the core used to execute software instructions to perform the operation or processing, the processor may further include a necessary hardware accelerator, such as a field programmable gate array (field programmable gate array, FPGA), a PLD (programmable logic device), or a logic circuit that implements a dedicated logic operation.

When the foregoing modules or units are implemented by hardware, the hardware may be any one of or any combination of a CPU, a microprocessor, a DSP, an MCU, an artificial intelligence processor, an ASIC, a SoC, an FPGA, a PLD, a dedicated digital circuit, a hardware accelerator, or a non-integrated discrete device. The hardware may run necessary software or not depend on software to execute the foregoing method procedures.

The invention claimed is:

1. An electronic device, comprising:
an application processor; and
a display screen, comprising a display driver chip and a display panel;
wherein the display panel is configured to display a first image;
wherein the application processor is configured to send first indication information and a first parameter to the display driver chip, wherein the first parameter is determined by the application processor based on a grayscale of a mask area in the first image, and the mask area is an area in the first image other than a fingerprint recognition area;
wherein the display driver chip is configured to control, based on the first indication information received from the application processor, a brightness of the fingerprint recognition area in the first image to be a first brightness, and control a brightness of the mask area in the first image to be a second brightness, wherein the brightness of the mask area is controlled based on the first parameter;
wherein the display panel is configured to display an updated first image, wherein the brightness of the fingerprint recognition area in the updated first image is the first brightness, and the brightness of the mask area is the second brightness; and
wherein when the display panel displays the updated first image, a light adjustment mode of the display screen is direct current adjustment, and the first parameter is an alpha value determined based on the grayscale of the mask area and a light adjustment mode that is of the display screen and that is used when the display panel displays the first image; and
wherein:
when the light adjustment mode that is of the display screen and that is used when the display panel displays the first image is pulse-width modulation (PWM), the first parameter is less than 1; or
when the light adjustment mode that is of the display screen and that is used when the display panel displays the first image is direct current adjustment, the first parameter is equal to 1.

2. The electronic device of claim 1, wherein the display driver chip being configured to control the brightness of the fingerprint recognition area in the first image to be the first brightness comprises the display driver chip being configured to:
set a grayscale of a pixel in the fingerprint recognition area to a first value, and set a display brightness value corresponding to the fingerprint recognition area to a second value, wherein a value of a grayscale of a pixel in the display panel other than the fingerprint recognition area is less than or equal to the first value, a display brightness value of the pixel in the display panel other than the fingerprint recognition area is less than or equal to the second value, a grayscale corresponding to the first brightness is the first value, and a corresponding display brightness value is the second value.

3. The electronic device of claim 1, wherein the application processor is further configured to send a brightness code of the fingerprint recognition area to the display driver chip, wherein the brightness code indicates at least one of the following: brightness, a color, a shape, a size, or a location; and wherein the display driver chip being configured to control the brightness of the fingerprint recognition area in the first image to be the first brightness comprises the display driver chip being configured to:
control display of the fingerprint recognition area in the first image based on the brightness code received from the application processor.

4. The electronic device of claim 1, wherein the brightness of the fingerprint recognition area in the updated first image is greater than the brightness of the fingerprint recognition area in the first image; and
wherein the brightness and display content of the mask area in the updated first image are the same as the brightness and display content of the mask area in the first image.

5. The electronic device of claim 1, wherein:
when the display panel displays the first image, the light adjustment mode of the display screen is pulse-width modulation (PWM), and the grayscale of the mask area is a first grayscale;
the display driver chip is further configured to switch the light adjustment mode of the display screen to the direct current based on the first indication information received from the application processor; and
the display driver chip being configured to control the brightness of the mask area in the first image comprises the display driver chip being configured to:
after the light adjustment mode of the display screen is switched to the direct current, multiply the first parameter by a second grayscale corresponding to the mask area, wherein the second grayscale is greater than the first grayscale; and
wherein when the display panel displays the updated first image, the grayscale of the mask area is the first grayscale obtained by multiplying the second grayscale by the first parameter, and a grayscale corresponding to the second brightness is the first grayscale.

6. The electronic device of claim 1, wherein the fingerprint recognition area comprises a first fingerprint recognition area and a second fingerprint recognition area, and the display driver chip comprises a first display driver chip and a second display driver chip;
wherein the first display driver chip is configured to control brightness of the first fingerprint recognition area in the first image based on the received first indication information; and
wherein the second display driver chip is configured to control brightness of the second fingerprint recognition area in the first image based on the received first indication information.

7. The electronic device according to claim 1, wherein the electronic device is a mobile device.

8. The electronic device according to claim 1, wherein the display panel is further configured to display fingerprint unlocking prompt information.

9. A communication apparatus, comprising:
at least one processor;
at least one memory; and
a communication interface;
wherein the at least one processor is configured to execute computer instructions stored in the at least one memory, to control a display panel of a display screen to display a first image;
wherein the communication interface is configured to:
receive first indication information and a first parameter, and transmit the first indication information and the first parameter to the at least one processor, wherein the first parameter is determined based on a grayscale of a mask area in the first image, and the mask area is an area in the first image other than a fingerprint recognition area;
wherein the at least one processor is configured to further execute computer instructions stored in the at least one memory, to:
control, based on the first indication information received from the communication interface, a brightness of a fingerprint recognition area in the first image to be a first brightness, and control a brightness of the mask area in the first image to be a second brightness, wherein the brightness of the mask area is controlled based on the first parameter; and
control the display panel to display an updated first image, wherein the brightness of the fingerprint recognition area in the updated first image is the first brightness, and the brightness of the mask area is the second brightness; and
wherein when the display panel displays the updated first image, a light adjustment mode of the display screen is direct current adjustment, and the first parameter is an alpha value determined based on the grayscale of the mask area and a light adjustment mode that is of the display screen and that is used when the display panel displays the first image; and
wherein:
when the light adjustment mode that is of the display screen and that is used when the display panel displays the first image is pulse-width modulation (PWM), the first parameter is less than 1; or
when the light adjustment mode that is of the display screen and that is used when the display panel displays the first image is direct current adjustment, the first parameter is equal to 1.

10. The communication apparatus of claim 9, wherein the at least one processor being configured to execute computer instructions stored in the at least one memory, to control the brightness of the fingerprint recognition area in the first image to be the first brightness comprises the at least one processor being configured to execute computer instructions stored in the at least one memory, to:
set a grayscale of a pixel in the fingerprint recognition area to a first value, and set a display brightness value in the fingerprint recognition area to a second value, wherein a value of a grayscale of a pixel in the display panel other than the fingerprint recognition area is less than or equal to the first value, a display brightness value of the pixel in the display panel other than the fingerprint recognition area is less than or equal to the second value, a grayscale corresponding to the first brightness is the first value, and a corresponding display brightness value is the second value.

11. The communication apparatus of claim 9, wherein the communication interface is further configured to:

receive a brightness code of the fingerprint recognition area, and transmit the brightness code to the at least one processor, wherein the brightness code indicates at least one of the following: brightness, a color, a shape, a size, or a location; and wherein the at least one processor being configured to further execute computer instructions stored in the at least one memory, to control the brightness of the fingerprint recognition area in the first image to be the first brightness comprises the at least one processor being configured to further execute computer instructions stored in the at least one memory, to control display of the fingerprint recognition area in the first image based on the brightness code received from the communication interface.

12. The communication apparatus of claim 9, wherein:
the brightness of the fingerprint recognition area in the updated first image is greater than the brightness of the fingerprint recognition area in the first image; and
the brightness and display content of the mask area in the updated first image are the same as the brightness and display content of the mask area in the first image.

13. A display method, applied to an electronic device, wherein the electronic device comprises an application processor and a display screen, the display screen comprises a display driver chip and a display panel, and the method comprises:

displaying, by the display panel, a first image;
sending, by the application processor, first indication information and a first parameter to the display driver chip, wherein the first parameter is determined by the application processor based on a grayscale of a mask area in the first image, and the mask area is an area in the first image other than a fingerprint recognition area;
controlling, by the display driver chip based on the first indication information received from the application processor, a brightness of a fingerprint recognition area in the first image to be a first brightness, and controlling a brightness of the mask area in the first image to be a second brightness, wherein the brightness of the mask area is controlled based on the first parameter; and
displaying, by the display panel, an updated first image, wherein the brightness of the fingerprint recognition area in the updated first image is the first brightness, and the brightness of the mask area is the second brightness; and
wherein when the display panel displays the updated first image, a light adjustment mode of the display screen is direct current adjustment, and the first parameter is an alpha value determined based on the grayscale of the mask area and a light adjustment mode that is of the display screen and that is used when the display panel displays the first image; and
wherein:
when the light adjustment mode that is of the display screen and that is used when the display panel displays the first image is pulse-width modulation (PWM), the first parameter is less than 1; or
when the light adjustment mode that is of the display screen and that is used when the display panel displays the first image, the first parameter is equal to 1.

14. The method of claim 13, wherein controlling the brightness of the fingerprint recognition area in the first image to be the first brightness comprises:
setting a grayscale of a pixel in the fingerprint recognition area to a first value, and setting a display brightness value in the fingerprint recognition area to a second value, wherein a value of a grayscale of a pixel in the display panel other than the fingerprint recognition area is less than or equal to the first value, a display brightness value of the pixel in the display panel other than the fingerprint recognition area is less than or equal to the second value, a grayscale corresponding to the first brightness is the first value, and a corresponding display brightness value is the second value.

15. The method of claim 13, further comprising:
sending, by the application processor, a brightness code of the fingerprint recognition area to the display driver chip, wherein the brightness code indicates at least one of the following: brightness, a color, a shape, a size, or a location; and
wherein controlling the brightness of the fingerprint recognition area in the first image to be the first brightness comprises: controlling display of the fingerprint recognition area in the first image based on the brightness code received from the application processor.

16. The method of claim 13, wherein:
the brightness of the fingerprint recognition area in the updated first image is greater than the brightness of the fingerprint recognition area in the first image; and
the brightness and display content of the mask area in the updated first image are the same as the brightness and display content of the mask area in the first image.

17. The method of claim 13, wherein when the display panel displays the first image, the light adjustment mode of the display screen is pulse-width modulation, and the grayscale of the mask area is a first grayscale; and the method further comprises:
switching the light adjustment mode of the display screen to the direct current based on the received first indication information; and
wherein controlling the brightness of the mask area in the display panel comprises:
after the light adjustment mode of the display screen is switched to the direct current, multiplying the first parameter by a second grayscale corresponding to the mask area, wherein the second grayscale is greater than the first grayscale; and
wherein when the display panel displays the updated first image, the grayscale of the mask area is the first grayscale obtained by multiplying the second grayscale by the first parameter, and a grayscale corresponding to the second brightness is the first grayscale.

18. The method of claim 13, wherein the fingerprint recognition area comprises a first fingerprint recognition area and a second fingerprint recognition area, and the display driver chip comprises a first display driver chip and a second display driver chip; and
wherein controlling, by the display driver chip based on the first indication information received from the application processor, the brightness of the fingerprint recognition area in the first image to be the first brightness comprises:
controlling, by the first display driver chip, the brightness of the first fingerprint recognition area in the first image based on the first indication information received from the application processor, and controlling, by the second display driver chip, brightness of the second fingerprint recognition area in the first image based on the first indication information received from the application processor.

19. The method of claim 13, further comprising:
collecting, using light provided by the fingerprint recognition area, optical fingerprint information of a finger acting on the fingerprint recognition area.

20. The method of claim 13, wherein the electronic device is a mobile device.

* * * * *